United States Patent
Suh et al.

(10) Patent No.: US 7,292,641 B2
(45) Date of Patent: Nov. 6, 2007

(54) APPARATUS AND METHOD FOR TRANSMITTING/RECEIVING PREAMBLE SEQUENCE IN ORTHOGONAL FREQUENCY DIVISION MULTIPLEXING COMMUNICATION SYSTEM USING PLURALITY OF TRANSMISSION ANTENNAS

(75) Inventors: Chang-Ho Suh, Seoul (KR); Chan-Soo Hwang, Yongin-si (KR); Katz Marcos Daniel, Suwon-si (KR); Chan-Byoung Chae, Seoul (KR); Ho-Kyu Choi, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 651 days.

(21) Appl. No.: 10/891,613

(22) Filed: Jul. 15, 2004

(65) Prior Publication Data
US 2005/0013381 A1 Jan. 20, 2005

(30) Foreign Application Priority Data
Jul. 15, 2003 (KR) ........................ 10-2003-0048461

(51) Int. Cl.
H04K 1/00 (2006.01)
(52) U.S. Cl. ........................ 375/260; 375/299; 375/365; 370/203; 370/514
(58) Field of Classification Search ................. 375/260, 375/267, 299, 363–368; 370/203, 206, 515, 370/514
See application file for complete search history.

(56) References Cited

U.S. PATENT DOCUMENTS 7,233,625 B2 * 6/2007 Ma et al. ..................... 375/260

OTHER PUBLICATIONS

Larsson et al, "Preamble Design for Multiple-Antenna OFDM-Based WLANs With Null Subcarriers," 2001, IEEE, vol. 8, No. 11, pp. 285-288.*

* cited by examiner

Primary Examiner—Kevin Kim
(74) Attorney, Agent, or Firm—The Farrell Law Firm

(57) ABSTRACT

A method for generating a preamble sequence in an OFDM (Orthogonal Frequency Division Multiplexing) communication system that uses A sub-carriers in a frequency domain and uses N Tx (Transmission) antennas, includes the steps of: generating N sequences, each having a length of 'B/N', by dividing B sub-carriers from among the A sub-carriers by the 'N' indicative of the number of the Tx antennas; and mapping, for each of the N sequences, individual components of the sequence to the B/N sub-carriers from among the A sub-carriers on a one by one basis in order to assign the components of the sequence to the B/N sub-carriers, and assigning null data to remaining sub-carriers other than the B/N sub-carriers from among the A-sub-carriers, such that a preamble sequence of a corresponding Tx antenna is generated.

25 Claims, 11 Drawing Sheets

US 7,292,641 B2

APPARATUS AND METHOD FOR TRANSMITTING/RECEIVING PREAMBLE SEQUENCE IN ORTHOGONAL FREQUENCY DIVISION MULTIPLEXING COMMUNICATION SYSTEM USING PLURALITY OF TRANSMISSION ANTENNAS

This application claims priority to an application entitled "APPARATUS AND METHOD FOR TRANSMITTING/ RECEIVING PREAMBLE SEQUENCE IN ORTHOGONAL FREQUENCY DIVISION MULTIPLEXING COMMUNICATION SYSTEM USING PLURALITY OF TRANSMISSION ANTENNAS", filed in the Korean Intellectual Property Office on Jul. 15, 2003 and assigned Serial No. 2003-48461, the contents of which are incorporated herein by reference.

BACKGROUND OF THE INVENTION

1. Field of the Invention

The present invention relates to an OFDM (Orthogonal Frequency Division Multiplexing) communication system, and more particularly to an apparatus and method for transmitting/receiving a preamble sequence having a minimum PAPR (Peak-to-Average Power Ratio) in an OFDM communication system using a plurality of transmission antennas.

2. Description of the Related Art

Typically, a wireless communication system provides its users or subscribers with wireless communication services, and is composed of a Node B and a UE (User Equipment). The Node B and the UE support the wireless communication services using a transmission frame. Therefore, the Node B and the UE must acquire mutual synchronization to transmit/ receive the transmission frame. For this synchronization acquisition, the Node B transmits a synchronous signal, such that the UE can recognize a start point of the frame transferred from the Node B. The UE receives the synchronous signal from the Node B to recognize a frame timing of the Node B, and demodulates a reception frame according to the recognized frame timing. Generally, the synchronous signal is determined to be a specific preamble sequence engaged between the Node B and the UE.

The preamble sequence for use in the OFDM communication system uses a low PAPR (Peak-to-Average Power Ratio). A preamble transferred from the Node B to the UE is a long preamble, and is formed by connecting a preamble required for a coarse synchronization to a short preamble required for a fine frequency synchronization. A preamble transferred from the UE to the Node B acquires the fine frequency synchronization using only the short preamble. The reason why the low PAPR must be adapted as the preamble sequence for the OFDM communication system is as follows. The OFDM communication system uses a plurality of carriers (i.e. a plurality of sub-carriers) as a multi-carrier communication system, such that it highly considers orthogonality of the individual sub-carriers. Therefore, a phase is established between the sub-carriers, such that the mutual orthogonality is provided between the sub-carriers. If the phase is changed to another phase during a signal transmission/reception time through the sub-carriers, the signals between the sub-carriers may overlap one another. In this case, the magnitude of each signal overlapped with another signal due to the changed phase escapes from a linear interval of an amplifier included in the OFDM communication system, such that the signal transmission/reception cannot be normally performed, and thereby the OFDM communication system uses a preamble sequence having a minimum PAPR.

The OFDM communication system time-multiplexes one frame, such that it transmits data associated with a plurality of users (i.e. UEs). A frame preamble indicative of a frame start point in the OFDM communication system is transmitted during only a predetermined interval from the frame start point to a predetermined target point. Data may be irregularly transmitted to the respective UEs in the single frame, such that a burst preamble indicative of a data start point is positioned in front of each data. Therefore, the UE must receive the data preamble to recognize a transmission start point of the data. Specifically, the UE must establish synchronization with the data start point to receive the desired data. For this synchronization acquisition, the UE must acquire a preamble sequence commonly used in all the systems, and must establish synchronization with the acquired preamble sequence.

The OFDM communication system is the same as other communication systems, which do not use the OFDM scheme in various aspects, i.e. a source coding scheme, a channel coding scheme, and a modulation scheme, etc. The OFDM communication system performs an IFFT (Inverse Fast Fourier Transform) of data and inserts a guard interval into the IFFT-processed data, whereas a CDMA (Code Division Multiple Access) communication system spreads data and transmits the spread data. Therefore, the OFDM communication system can transmit a broadband signal using relatively simple hardware architecture as compared to the CDMA communication system. In more detail, if the OFDM communication system binds a plurality of bit/ symbol sequences after modulating the data, and enters parallel bit/symbol sequences in the form of an IFFT entry signal corresponding to a frequency domain, a time domain signal in the form of an IFFT configuration is generated. In this case, the output time domain signal is configured by multiplexing a broadband signal with a plurality of narrowband sub-carrier signals, and a plurality of modulation symbols are transmitted via the IFFT process during a single OFDM symbol interval.

However, if the OFDM communication system transmits the IFFT-processed OFDM symbol without any change, interference unavoidably occurs between a previous OFDM symbol and a current OFDM symbol. In order to remove the interference, the guard interval must be inserted. In this case, the guard interval is inserted using either one of a Cyclic Prefix scheme and a Cyclic Postfix scheme. The Cyclic Prefix scheme copies the last samples of the OFDM symbols contained in a time domain, and inserts the copied samples in an effective OFDM symbol. The Cyclic Postfix scheme copies the initial samples of the OFDM symbols contained in a time domain, and inserts the copied samples in an effective OFDM symbol. In this case, the samples for use in the Cyclic Prefix scheme and the Cyclic Postfix scheme are predetermined samples, and their magnitudes are also predetermined in the OFDM communication system. The guard interval may be adapted to acquire the time/frequency synchronization of an OFDM symbol received in a receiver using unique characteristics in which some parts of a single OFDM symbol of a time domain, i.e. the first part or the last part of the single OFDM symbol, are copied, and the copied parts are repeatedly arranged.

A transmission signal of a transmitter is distorted over an RF (Radio Frequency) channel, such that a receiver receives the distorted transmission signal. The receiver acquires the time/frequency synchronization of the distorted reception signal using a preamble sequence engaged between the transmitter and the receiver, performs a channel estimation of the distorted reception signal, and performs an FFT (Fast Fourier Transform) of the channel-estimation result, such that the distorted reception signal can be demodulated to frequency-domain symbols. After demodulating the frequency-domain symbols, the receiver applies a channel encoding scheme and a source decoding scheme to the demodulated symbols according to a channel coding method used in the transmitter, such that they are decoded into data.

The OFDM communication system uses a preamble sequence in three aspects, i.e. frame timing synchronization, frequency synchronization, and channel estimation. Needless to say, the OFDM communication system may also perform the frame timing synchronization, the frequency synchronization, and the channel estimation, etc., using a guard interval and a pilot sub-carrier, instead of using the preamble sequence. In the case of the preamble sequence, known symbols are transmitted at a forward part of each frame or data burst, and estimated time/frequency/channel information is updated at a data transmission part using various information, e.g., guard interval and pilot sub-carrier, etc.

The preamble sequence structure for use in the OFDM communication system will hereinafter be described with reference to FIGS. 1 and 2.

FIG. 1 is a diagram illustrating a long preamble sequence of a conventional OFDM communication system.

Prior to describing FIG. 1, a current OFDM communication system uses the same preamble sequence in the DL (Down Link) and the UL (Up Link) directions. Referring to FIG. 1, the long preamble sequence is configured by repeating a sequence of 64 lengths four times and repeating another sequence of 128 lengths two times. According to the aforementioned characteristics of the OFDM communication system, a Cyclic Prefix (CP) is positioned in front of a sequence in which the sequence of 64 lengths is repeated four times, and is also positioned in front of another sequence in which the sequence of 128 lengths is repeated two times. Also, the signals before performing the IFFT are frequency-domain signals, and the other signals after performing the IFFT are time-domain signals. The long preamble sequence shown in FIG. 1 is indicative of a long preamble sequence in a time domain after the IFFT has been performed.

In the meantime, a long preamble sequence in a frequency domain before performing the IFFT can be represented by the following expressions:

$S(-100:100) =$ $\{+1+j, 0, 0, 0, +1+j, 0, 0, 0, +1+j, 0, 0, 0, +1-j, 0, 0, 0, -1+j,$ $0, 0, 0, +1+j, 0, 0, 0, +1+j, 0, 0, 0, +1+j, 0, 0, 0, +1-j, 0,$ $0, 0, -1+j, 0, 0, 0, +1+j, 0, 0, 0, +1+j, 0, 0, 0, +1+j, 0, 0,$ $0, +1-j, 0, 0, 0, -1+j, 0, 0, 0, +1-j, 0, 0, 0, +1-j, 0, 0, 0,$ $+1-j, 0, 0, 0, -1-j, 0, 0, 0, +1+j, 0, 0, 0, -1+j, 0, 0, 0,$ $-1+j, 0, 0, 0, -1+j, 0, 0, 0, +1+j, 0, 0, 0, -1-j, 0, 0, 0,$ $0, 0, 0, 0, -1-j, 0, 0, 0, +1-j, 0, 0, 0, +1+j, 0, 0, 0, -1-j, 0, 0, 0,$ $-1+j, 0, 0, 0, +1-j, 0, 0, 0, +1+j, 0, 0, 0, -1+j, 0, 0, 0, +1-j,$ $0, 0, 0, -1-j, 0, 0, 0, +1+j, 0, 0, 0, -1+j, 0, 0, 0, -1-j, 0, 0,$ $0, +1+j, 0, 0, 0, +1-j, 0, 0, 0, -1-j, 0, 0, 0, +1-j, 0, 0, 0,$ $+1+j, 0, 0, 0, -1-j, 0, 0, 0, -1+j, 0, 0, 0, -1+j, 0, 0, 0, -1-j,$ $0, 0, 0, +1-j, 0, 0, 0, -1+j, 0, 0, 0, +1+j\} * sqrt(2) * sqrt(2)$ $P(-100:100) = \{-1, 0, +1, 0, +1, 0, +1, 0, +1, 0, -1, 0, -1, 0,$ $+1, 0, -1, 0, +1, 0, -1, 0, -1, 0, +1, 0, +1, 0, -1, 0, +1, 0,$ $-1, 0, +1, 0, -1, 0, +1, 0, -1, 0, +1, 0, +1, 0, -1, 0, +1,$ $0, -1, 0, -1, 0, +1, 0, -1, 0, -1, 0, -1, 0, +1, 0, +1, 0,$ $-1, 0, +1, 0, +1, 0, +1, 0, -1, 0, +1, 0, +1, 0, -1, 0, -1,$ $0, -1, 0, +1, 0, +1, 0, +1, 0, +1, 0, +1, 0, +1, 0, +1, 0,$ $0, 0$ $-1, 0, -1, 0, +1, 0, -1, 0, -1, 0 + 1, 0 + 1, 0 + 1, 0 - 1, 0,$ $+1, 0 + 1, 0, +1, 0, -1, 0, -1, 0, -1, 0, -1, 0, -1, 0, -1, 0,$ $+1, 0, -1, 0, -1, 0, -1, 0, -1, 0, -1, 0, -1, 0, +1, 0, +1,$ $0, +1, 0, -1, 0, +1, 0, -1, 0, +1, 0, +1, 0, -1, 0, +1, 0,$ $+1, 0, +1, 0, -1, 0, -1, 0, -1, 0, -1, 0, -1, 0, +1, 0, -1,$ $0, -1, 0, +1, 0, -1, 0, -1, 0, +1, 0, -1\} * sqrt(2) * sqrt(2)$ The long preamble sequences in the frequency domain, i.e. numerals shown in S(−100:100) and P(−100:100), are indicative of the positions of the sub-carriers used during the IFFT process, and will be described with reference to FIG. 3, such that its detailed description will herein be omitted for the convenience of description. S(−100:100) is indicative of a frequency-domain sequence in which a sequence of 64 lengths is repeated four times, and P(−100:100) is indicative of a frequency-domain sequence in which a sequence of 128 lengths is repeated two times. In the aforementioned S(−100:100) and P(−100:100), the reference symbol 'sqrt(2)' is indicative of the square root of 2, and the reference symbol 'sqrt(2)*sqrt(2)' is indicative of two-stage amplification to increase each Transmit Power of the S(−100:100) and P(−100:100).

The aforementioned description has disclosed the long preamble sequence with reference to FIG. 1, and a short preamble sequence will hereinafter be described with reference to FIG. 2.

FIG. 2 is a diagram illustrating a short preamble sequence of the conventional OFDM communication system.

Referring to FIG. 2, the short preamble sequence is configured by repeating a sequence of 128 lengths two times. According to characteristics of the OFDM communication system, a Cyclic Prefix (CP) is positioned in front of a sequence in which the sequence of 128 lengths is repeated two times. The short preamble sequence of FIG. 2 is indicative of a short preamble sequence in a time domain after the IFFT process has been performed. A short preamble sequence in a frequency domain is indicative of P(−100:100) shown in FIG. 2.

The aforementioned long preamble sequence must be generated satisfying the following four conditions:

1) First, the long preamble sequence must have a low PAPR.

To maximize the transmission efficiency of a PA (Power Amplifier) of a transmission end of an OFDM communication system's transmitter, a PAPR of an OFDM symbol must be low. In more detail, the IFFT-processed signal is applied to the PA, and a low PAPR is required due to the non-linear characteristics of the PA. The PAPR of the OFDM symbol must have a low ratio of maximum power to mean power of an OFDM time-domain symbol corresponding to an IFFT output end of the transmission end. In order to achieve the low ratio of the maximum power to the mean power, the PAPR of the OFDM symbol must achieve a uniform distribution. Specifically, if symbols each having a low cross-correlation are combined with each other in the frequency domain (i.e., an IFFT input end of the transmission end), an output PAPR is reduced.

2) Second, the long preamble sequence must be suitable for estimating parameters required for communication initiation.

The parameter estimation process includes a channel estimation process, a frequency offset estimation process, and a time offset estimation process.

3) Third, the long preamble sequence must include a low complexity and a low overhead.

4) Fourth, the long preamble sequence must be able to perform appropriate frequency offset estimation.

Various functions of the long preamble sequence generated considering the aforementioned items will be described as follows:

1) A sequence in which a sequence of 64 lengths is repeated four times is adapted to estimate a time offset and an appropriate frequency offset.

2) A sequence in which a sequence of 128 lengths is repeated two times is adapted to estimate a fine frequency offset and a channel.

In conclusion, the long preamble sequence is used for the following functions in the OFDM communication system.

1) The long preamble sequence is used as a first preamble sequence of a DL (Downlink) Protocol Data Unit (PDU).

2) The long preamble sequence is used in an initial ranging process.

3) The long preamble sequence is used in a bandwidth request ranging process.

The short preamble sequence is used for the following functions in the OFDM communication system.

1) The short preamble sequence is used as a UL (Uplink) data preamble sequence.

2) The short preamble sequence is used in a periodic ranging process.

The OFDM communication system can acquire the correct synchronization by performing the initial ranging process and the periodic ranging process, such that the UL data preamble sequence is mainly adapted to perform channel estimation. A variety of items are considered in the channel estimation process, for example, the PAPR, the performance, and the complexity. The PAPR for use in the conventional short preamble sequence is indicative of 3.5805 dB. A variety of channel estimation algorithms may be used as a channel estimation algorithm, for example, a Minimum Mean Square Error (MMSE) and a Least Square (LS), etc.

A relationship between the sub-carriers and the preamble sequence when the conventional OFDM communication system performs the IFFT process will hereinafter be described with reference to FIG. 3.

FIG. 3 is a diagram illustrating the relationship between the sub-carriers and the preamble sequence when the conventional OFDM communication system performs the IFFT process.

FIG. 3 assumes a predetermined condition in which the number of the overall sub-carriers of the OFDM communication system is 256, namely, there are 256 sub-carriers from −128-th sub-carrier to 127-th sub-carrier and the number of utilized sub-carriers is 200. Specifically, 200 sub-carriers (i.e. −100-th sub-carrier, . . . , −1st sub-carrier, 1st sub-carrier, . . . , 100-th sub-carrier) are used in FIG. 3. Input numbers positioned in front of an IFFT unit are indicative of the frequency components, i.e. the sub-carriers' number. In this case, only 200 sub-carriers from among 256 sub-carriers (i.e. 200 sub-carriers other than the 0-th sub-carrier, sub-carriers from −128-th sub-carrier to −101st sub-carrier, and other sub-carriers from 101st sub-carrier to 127-th sub-carrier, from among the 256 sub-carriers) are used. Null data (i.e. 0 data) is inserted into each of the 0-th sub-carrier, the sub-carriers from −128-th sub-carrier to −101st sub-carrier, and the sub-carriers from 101st sub-carrier to 127-th sub-carrier, and the resultant data having the null data is transmitted to a desired target for the following reasons. First, the reason why the null data is inserted in the 0-th sub-carrier is that a reference point of a preamble sequence in a time domain is indicative of a DC component in the time domain after the 0-th sub-carrier performs the IFFT process. Also, the reason why the null data is inserted into 28 sub-carriers from −128-th sub-carrier to −101st sub-carrier and 27 sub-carriers from 101st sub-carrier to 127-th sub-carrier is to provide a frequency domain with a guard interval because the above 28 sub-carriers and the above 27 sub-carriers correspond to a high frequency bandwidth in the frequency domain.

If the frequency-domain preamble sequence S(−100:100) or P(−100:100) is received in the IFFT unit, the IFFT unit maps the frequency-domain preamble sequence S(−100:100) or P(−100:100) to the corresponding sub-carriers in order to perform the IFFT process, such that a time-domain preamble sequence is generated.

A transmitter of the OFDM communication system will hereinafter be described with reference to FIG. 4.

FIG. 4 is a block diagram of a transmitter for use in the conventional OFDM communication system.

Referring to FIG. 4, if information bits to be transmitted are present, the information bits are received in a symbol mapper 411. The symbol mapper 411 modulates the information bits into symbols using a predetermined modulation scheme, and the symbols are transmitted to a Serial to Parallel (S/P) converter 413. In this case, the modulation scheme may be determined to be either a QPSK (Quadrature Phase Shift Keying) or a 16 QAM (Quadrature Amplitude Modulation), etc. The S/P converter 413 receives the output symbol of the symbol mapper 411, converts the received symbol into parallel data so that it is identical to an A point indicative of an input numeral of an IFFT (Inverse Fast Fourier Transform) unit 419, and outputs the parallel data to a selector 417. The preamble sequence generator generates a corresponding preamble sequence according to a control signal of a controller (not shown), and outputs the preamble sequence to the selector 417. The selector 417 selects either the output signal of the S/P converter 413 or output signals of the preamble sequence generator 415 according to a scheduling state of a corresponding time, and outputs the selected one to the IFFT unit 419.

The IFFT unit 419 receives the output signals of the selector 417, performs an A-point IFFT process on the received signals, and outputs the IFFT-processed result to a P/S (Parallel to Serial) converter 421. The P/S converter 421 receives a Cyclic Prefix of length 'L' along with the output signals of the IFFT unit 419. The P/S converter 421 converts the output signals of the IFFT unit 419 and the Cyclic Prefix into serial data, and outputs the serial data to a DAC (Digital to Analog Converter) 423. The DAC 423 receives the output signal of the P/S converter 421, converts the received signal into analog data, and outputs the analog data to an RF (Radio Frequency) processor 425. The RF processor 425 includes a filter and a front end unit, RF-processes the output signal of the DAC 423 so as to allow the output signal of the DAC 423 to be transmitted wirelessly, and transmits the RF-process result via an antenna.

A preamble sequence of the OFDM communication system using a plurality of transmission (Tx) antennas, e.g., N Tx antennas, and a method for generating the preamble sequence will hereinafter be described.

In the case of the OFDM communication system using the N Tx antennas, the preamble sequences must be transmitted over the N Tx antennas so as to estimate a channel of the data transmitted over each of the N Tx antennas passes. However, if the number of the Tx antennas of a current OFDM communication system is at least '2', there is no method capable of transmitting the preamble sequences to estimate the channel of the data transmitted over each Tx antenna.

Provided that different sub-carriers are assigned to individual Tx antennas such that the assignment of the preamble sequences is established, a receiver is able to perform the channel estimation of the sub-carriers assigned for the preamble sequences, but is unable to perform the channel estimation of the remaining sub-carriers. Therefore, the preamble transmission regulations for performing the channel estimation of all of the sub-carriers are required for the individual Tx antennas on the condition that the number of the Tx antennas is at least '2'.

The OFDM communication system must use a preamble sequence having a low PAPR as previously stated above. Recently, many developers are actively conducting intensive research into a method for generating the preamble sequence having the low PAPR in a typical OFDM communication system, i.e. an OFDM communication system which uses a single Tx antenna. In the same manner as in the OFDM communication system using the single Tx antenna, another OFDM communication system using at least two Tx antennas (i.e. a plurality of Tx antennas) must use the preamble sequence having the low PAPR. However, a method for generating the preamble sequence having the low PAPR in the OFDM communication system which uses a plurality of Tx antennas has not been proposed yet, such that there is a need for the method for generating the preamble sequence having the low PAPR to be developed.

A channel estimation method in a frequency domain generally used in the OFDM communication system will hereinafter be described.

Provided that the number of input signals of the IFFT unit used in the OFDM communication system, i.e. the number of points of the IFFT unit, is 'A', and the number of real sub-carriers is 'B', a preamble sequence in a frequency domain can be represented by the following Equation 1:

$$X_k, \text{ where } k=-B/2, \ldots -1, 1, \ldots B/2 \quad (1)$$

Provided that a channel response in the frequency domain is $H_k$, a signal generated when a receiver of the OFDM communication system FFT-processes its reception signal can be represented by the following Equation 2:

$$Y_k = H_k X_k + Z_k, \text{ where } k=-B/2, \ldots -1, 1, \ldots B/2 \quad (2)$$

With reference to Equation 2, $Z_k$ is indicative of an AWGN (Additive White Gaussian Noise). In this case, a signal $Y_k$ generated when the FFT process is performed must be divided by a known signal $X_k$ predetermined by mutual regulations between a transmitter and a receiver, and can be represented by the following Equation 3:

$$H^*_k = Y_k/X_k = H_k + Z_k/X_k, \text{ where } k=-B/2, \ldots -1, 1, \ldots B/2 \quad (3)$$

Problems of the channel estimation operation of the OFDM communication system including a plurality of Tx antennas (e.g., N Tx antennas) will hereinafter be described.

First, the OFDM communication system including N Tx antennas must transmit preamble sequences over the N Tx antennas, such that it can correctly estimate a channel state of signals transmitted over each of the N Tx antennas. However, as stated above, a current OFDM communication system has no method capable of transmitting the preamble sequences using the N Tx antennas. Provided that the different sub-carriers are assigned to the individual N Tx antennas and then the preamble sequences are transmitted, although the receiver can perform the channel estimation of the sub-carriers assigned for transmitting the preamble sequences when the receiver performs a channel estimation process in the frequency domain, the receiver is unable to perform the channel estimation of the remaining sub-carriers.

Typically, the sub-carriers which are unable to perform the channel estimation may perform such channel estimation on the condition that the channel states of the channel-estimated sub-carriers are interpolated. As the frequency selective characteristic of the OFDM communication system is at a high level and the number of used Tx antennas increases, the channel estimation performance obtained by the above interpolation is deteriorated. Therefore, a channel estimation method capable of performing the channel estimation for all of the sub-carriers of the individual Tx antennas must be developed.

SUMMARY OF THE INVENTION

Therefore, the present invention has been made in view of the above and other problems, and it is an object of the present invention to provide an apparatus and method for transmitting/receiving a preamble sequence in an OFDM communication system including a plurality of Tx antennas.

It is another object of the present invention to provide an apparatus and method for generating a preamble sequence having a minimum PAPR in an OFDM communication system including a plurality of Tx antennas.

It is yet another object of the present invention to provide an apparatus and method for generating a preamble sequence such that it can correctly perform channel estimation in an OFDM communication system including a plurality of Tx antennas.

In accordance with one aspect of the present invention, the above and other objects can be accomplished by the provision of an apparatus for generating a preamble sequence in an OFDM (Orthogonal Frequency Division Multiplexing) communication system that uses A sub-carriers in a frequency domain and uses N Tx (Transmission) antennas, including: N sequence generators for each generating a sequence of a length equal to 'B/N' by dividing B sub-carriers from among the A sub-carriers by the 'N' indicative of the number of the Tx antennas; and N preamble sequence mappers for mapping individual components of the sequence to B/N sub-carriers from among the A sub-carriers on a one by one basis in order to assign the components of the sequence to the B/N sub-carriers, and assigning null data to remaining sub-carriers other than the B/N sub-carriers from among the A-sub-carriers, such that a preamble sequence of a corresponding Tx antenna is generated.

In accordance with another aspect of the present invention, there is provided an apparatus for channel estimation in an OFDM (Orthogonal Frequency Division Multiplexing)

communication system that transmits preamble sequences over N Tx (Transmission) antennas and uses M Rx (Reception) antennas, including: a first matrix synthesizer for receiving predetermined N preamble sequences related to the N Tx antennas to synthesize a first matrix; a second matrix synthesizer for receiving M Rx signals from the M Rx antennas to synthesize a second matrix; and a matrix multiplier for multiplying the first matrix by the second matrix, and estimating a channel response in a time domain.

In accordance with yet another aspect of the present invention, there is provided an apparatus for generating a preamble sequence in an OFDM (Orthogonal Frequency Division Multiplexing) communication system that uses A sub-carriers in a frequency domain and uses N Tx (Transmission) antennas, including: N sequence generators for each generating a sequence of a length of 'B/N' by dividing B sub-carriers from among the A sub-carriers by the 'N' indicative of the number of the Tx antennas, mapping individual components of the sequence to the B/N sub-carriers from among the A sub-carriers on a one by one basis in order to assign the components of the sequence to the B/N sub-carriers, and assigning null data to remaining sub-carriers other than the B/N sub-carriers from among the A-sub-carriers, such that a preamble sequence in a frequency domain of a corresponding Tx antenna is generated; N IFFT (Inverse Fast Fourier Transform) units are connected to each of the N preamble sequence generators, for receiving output signals of the preamble sequence generators, and IFFT-processing the received signals, such that each of the N IFFT units generates a preamble sequence in a time domain of a corresponding Tx antenna; and transmitters connected to the N IFFT units, each transmitter converts the IFFT-processed signal into a serial data signal, inserts a predetermined guard interval signal into the serial data signal, and transmits the resultant signal.

In accordance with yet another aspect of the present invention, there is provided a method for generating a preamble sequence in an OFDM (Orthogonal Frequency Division Multiplexing) communication system that uses A sub-carriers in a frequency domain and uses N Tx (Transmission) antennas, including generating N sequences, each having a length of 'B/N', by dividing B sub-carriers from among the A sub-carriers by the 'N' indicative of the number of the Tx antennas; and mapping, for each of the N sequences, individual components of the sequence to the B/N sub-carriers from among the A sub-carriers on a one by one basis in order to assign the components of the sequence to the B/N sub-carriers, and assigning null data to remaining sub-carriers other than the B/N sub-carriers from among the A-sub-carriers, such that a preamble sequence of a corresponding Tx antenna is generated.

In accordance with yet another aspect of the present invention, there is provided an method for channel estimation in an OFDM (Orthogonal Frequency Division Multiplexing) communication system that transmits preamble sequences over N Tx (Transmission) antennas and uses M Rx (Reception) antennas, including receiving predetermined N preamble sequences related to the N Tx antennas to synthesize a first matrix; receiving M Rx signals from the M Rx antennas to synthesize a second matrix; and multiplying the first matrix by the second matrix, and estimating a channel response in a time domain.

In accordance with yet another aspect of the present invention, there is provided a method for generating a preamble sequence in an OFDM (Orthogonal Frequency Division Multiplexing) communication system that uses A sub-carriers in a frequency domain and uses N Tx (Transmission) antennas, including generating N sequences, each having a length of 'B/N', by dividing B sub-carriers from among the A sub-carriers by the 'N' indicative of the number of the Tx antennas; mapping, for each of the N sequences, individual components of the sequence to the B/N sub-carriers from among the A sub-carriers on a one by one basis in order to assign the components of the sequence to the B/N sub-carriers, and assigning null data to remaining sub-carriers other than the B/N sub-carriers from among the A-sub-carriers, such that N preamble sequences in frequency domains of corresponding Tx antennas are generated; IFFT (Inverse Fast Fourier Transform)—processing the N preamble sequences of the frequency domains, and generating N preamble sequences in time domains of the corresponding Tx antennas; and converting each of the N preamble sequence in the time domains into a serial data signal, inserting a predetermined guard interval signal into the serial data signal, and transmits the resultant signal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
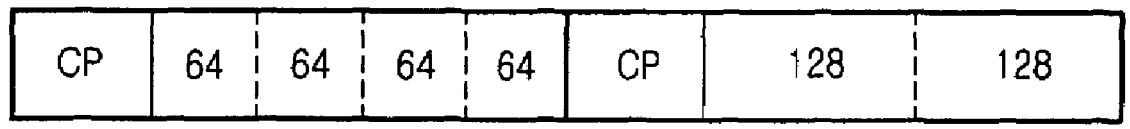
FIG. 1 is a diagram illustrating a long preamble sequence of a conventional OFDM communication system.
Figure 2:
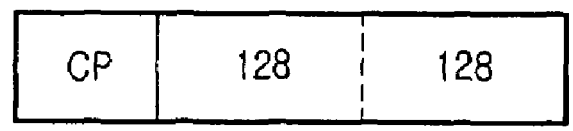
FIG. 2 is a diagram illustrating a short preamble sequence of the conventional OFDM communication system.
Figure 3:
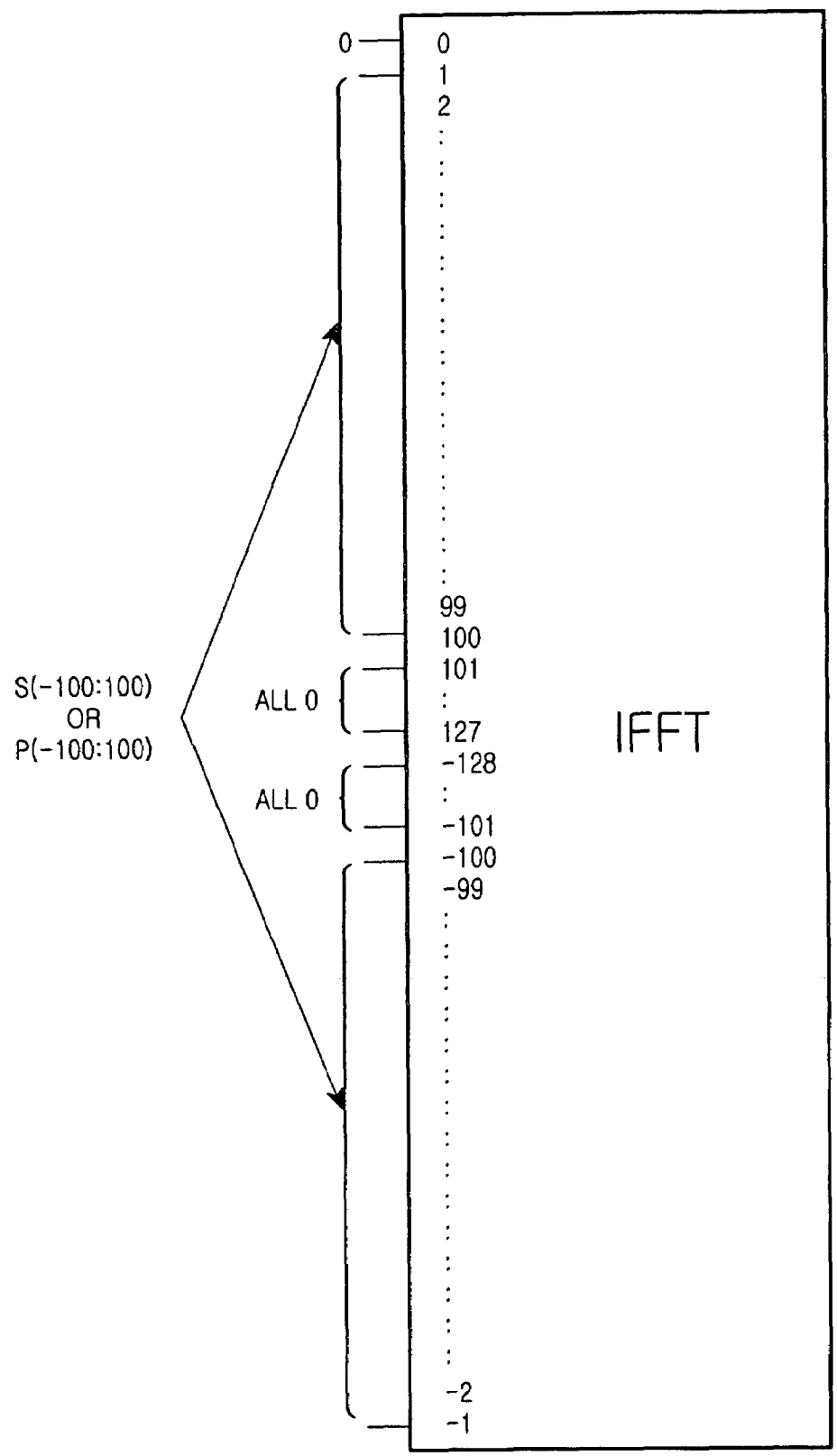
FIG. 3 is a diagram illustrating the relationship between sub-carriers and a preamble sequence when the conventional OFDM communication system performs an IFFT process.
Figure 4:
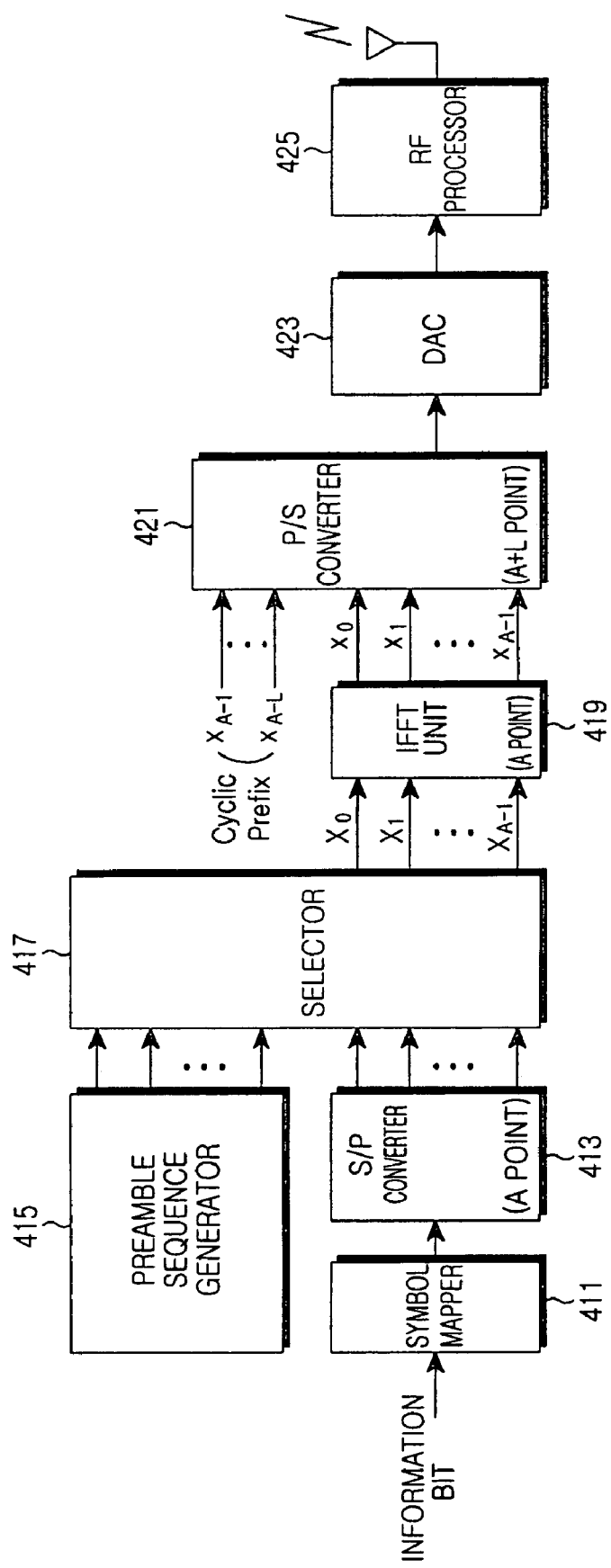
FIG. 4 is a block diagram illustrating a transmitter for use in the conventional OFDM communication system.

Now, preferred embodiments of the present invention will be described in detail with reference to the annexed drawings. In the drawings, the same or similar elements are denoted by the same reference numerals even though they are denoted by different drawings. In the following description, a detailed description of known functions and configurations incorporated herein will be omitted when it may obscure the subject matter of the present invention.

Figure 5:
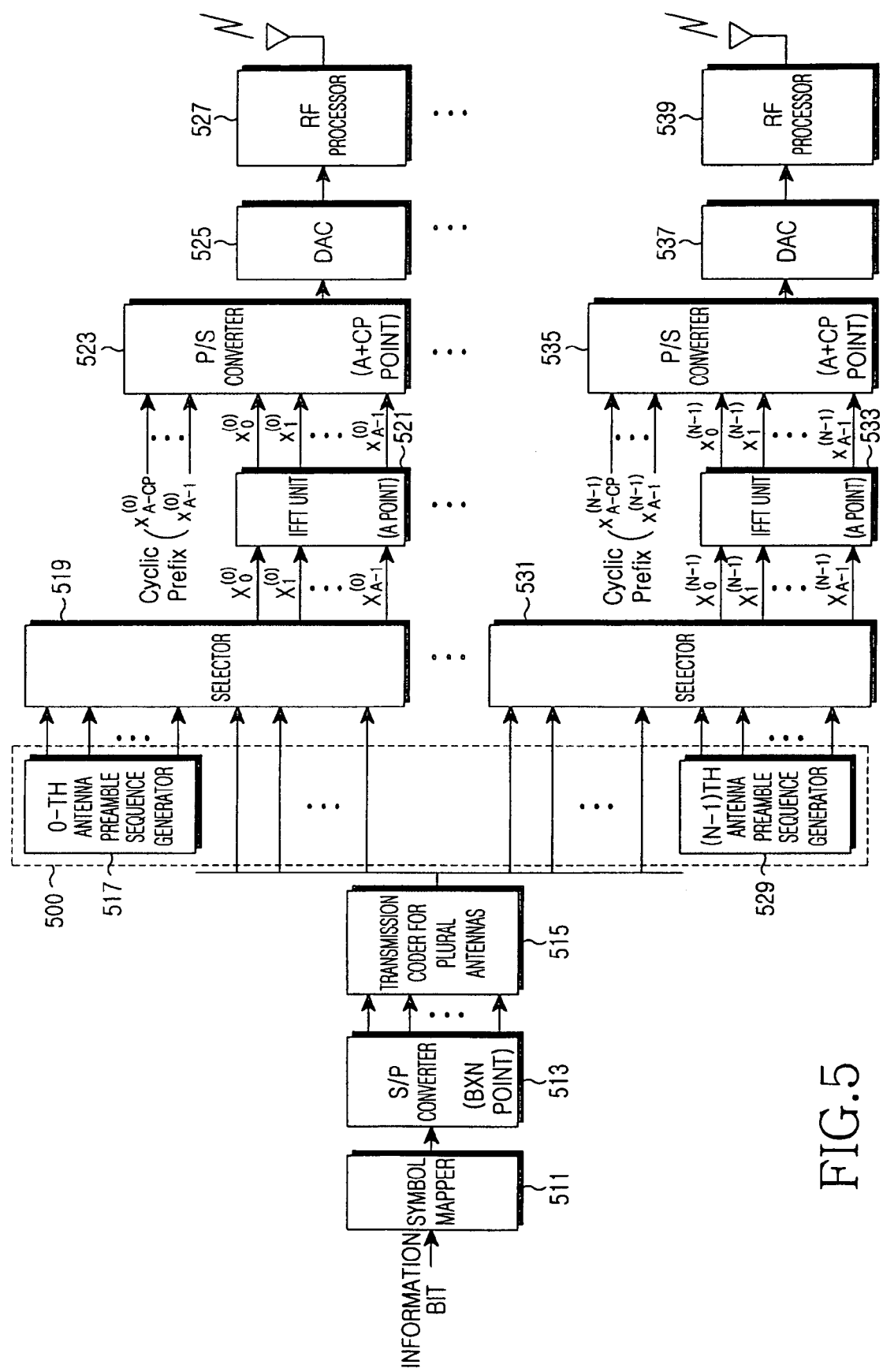
FIG. 5 is a block diagram illustrating a transmitter for use in an OFDM communication system in accordance with a preferred embodiment of the present invention.

FIG. 5 is a block diagram illustrating a transmitter for use in an OFDM communication system in accordance with a preferred embodiment of the present invention.

Referring to FIG. 5, if there exists information bits to be transmitted, the information bits are transmitted to a symbol mapper 511. The symbol mapper 511 modulates the received information bits into a symbol using a predetermined modulation scheme, and outputs the symbol to an S/P converter 513. In this case, the modulation scheme may be determined to be either a QPSK (Quadrature Phase Shift Keying) or a 16 QAM (Quadrature Amplitude Modulation), etc. The S/P converter 513 receives the output symbol of the symbol mapper 511, converts the received symbol into parallel data so that it is identical to a 'B×N' point, and outputs the parallel data to a transmission coder 515 for a plurality of antennas. In this case, 'B' is indicative of the number of the sub-carriers other than a sub-carrier indicative of a time-domain DC (Direct Current) component and the sub-carriers corresponding to a frequency-domain high-frequency band (i.e. sub-carriers corresponding to a guard interval), and 'N' is indicative of the number of the Tx antennas used in the OFDM communication system. In this case, the sub-carrier indicative of the time-domain DC component is equal to a reference point of a time-domain preamble sequence from among all of the sub-carriers used in the OFDM communication system.

The transmission coder 515 for the Tx antennas may be implemented with a space-time coder or a data multiplexer, etc., according to its application. For example, if the transmission coder 515 for the Tx antennas is adapted to acquire a Tx antenna diversity, the transmission coder 515 is implemented with the space-time coder. Otherwise, if the transmission coder 515 for the Tx antennas is adapted to increase data capacity, the transmission coder 515 is implemented with the data multiplexer. The output signal of the transmission coder 515 is transmitted to selectors 519 and 531. In this case, the number of the selectors is determined to be 'N', indicative of the number of the Tx antennas.

The preamble sequence generator 517 of the 0-th antenna (ANT #0) generates a corresponding preamble sequence according to a control signal of a controller (not shown), and outputs the preamble sequence to the selector 519. In this manner, an (N-1)-th antenna preamble sequence generator 529, corresponding to an (N-1)-th antenna (ANT #N-1) equal to the last Tx antenna, generates a corresponding preamble sequence according to a control signal of the controller, and outputs the preamble sequence to the selector 531. The operations of a plurality of sequence generators from the 0-th antenna (ANT #0) preamble sequence generator 517 to the (N-1)-th antenna (ANT #N-1) preamble sequence generator 529 will hereinafter be described, such that their detailed descriptions will herein be omitted for the convenience of description. The selector 519 selects either the output signal of the transmission coder 515 or the output signal of the 0-th antenna preamble sequence generator 517 according to the scheduling information of a corresponding time, and outputs the selected one to an IFFT unit 521. The output signals of the selector 519 are mapped to input signals corresponding to the 0-th antenna from among the input signals of the IFFT unit 521 on a one by one basis, and are then applied to the IFFT unit 521. The number of preamble sequence generators and the number of selectors are each equal to the number of the Tx antennas, and the preamble sequence generators and the selectors perform the same operation as in the aforementioned description. For the convenience of description, FIG. 5 depicts the 0-th antenna preamble sequence generator 517 and the selector 519 and the (N-1)-th antenna preamble sequence generator 529 and the selector 531.

The selector 519 determines whether to choose an output preamble sequence of the 0-th antenna preamble sequence generator 518 or an output signal of the transmission coder 515. The output signal of the 0-th antenna preamble sequence generator 517 or the output signal of the transmission coder 515, is transmitted to the IFFT unit 521 according to the above, selection result. The IFFT unit 521 receives the output signal of the selector 519, performs an A-point IFFT process on the received signal, and outputs the IFFT-process result to a P/S converter 523. The output signal of the IFFT unit 521 and a Cyclic Prefix signal of length 'CP' are transmitted to the P/S converter 523. In this case, the Cyclic Prefix is a guard interval signal. The guard interval is inserted using either a Cyclic Prefix scheme or a Cyclic Postfix scheme. The Cyclic Prefix scheme copies the last samples of the OFDM symbols contained in a time domain, and inserts the copied samples into an effective OFDM symbol. The Cyclic Postfix scheme copies the initial samples of the OFDM symbols contained in a time domain, and inserts the copied samples in an effective OFDM symbol. In this case, the samples for use in the Cyclic Prefix scheme and the Cyclic Postfix scheme are predetermined samples, and their magnitudes are also predetermined in the OFDM communication system. Disclosed herein is an exemplary case in which the guard interval is inserted using the Cyclic Prefix scheme. The P/S converter 523 converts the output signal of the IFFT unit 521 and the Cyclic Prefix signal into serial data, and outputs the serial data to a DAC 525. The DAC 525 receives the output signal of the P/S converter 523, converts the received signal into analog data, and outputs the analog data to an RF processor 527. In this case, the RF processor 527, which includes a filter and a front end unit, RF-processes the output signal of the DAC 525 so as to allow the output signal of the DAC 525 to be wirelessly transmitted, and transmits the RF-process result via the 0-th transmission antenna.

The (N-1)-th antenna preamble sequence generator 529 generates a corresponding preamble sequence according to a control signal of the controller, and outputs the preamble sequence to the selector 531. The selector 531 selects either the output signal of the transmission coder 515 or the (N-1)-th antenna preamble sequence generator 529 according to a scheduling state of a corresponding time, and outputs the selected one to an IFFT unit 533. In this case, the output signals of the selector 531 are mapped to input signals corresponding to the (N-1)-th antenna from among the input signals of the IFFT unit 533 on a one by one basis, and are then applied to the IFFT unit 533.

Specifically, the selector 531 determines whether to choose an output preamble sequence of the (N-1)-th antenna preamble sequence generator 529 or an output signal of the transmission coder 515. The output signal of the (N-1)-th antenna preamble sequence generator 529 or the output signal of the transmission coder 515 is transmitted to the IFFT unit 533 according to the above selection result. The IFFT unit 533 receives the output signal of the selector 531, performs an A-point IFFT process on the received signal, and outputs the IFFT-process result to a P/S converter 535. The output signal of the IFFT unit 521 and a Cyclic Prefix signal of length 'CP' are transmitted to the P/S converter 535. The P/S converter 535 converts the output signal of the IFFT unit 533 and the Cyclic Prefix signal into serial data, and outputs the serial data to a DAC 537. The DAC 537 receives the output signal of the P/S converter 535, converts the received signal into analog data, and outputs the analog data to an RF processor 539. The RF processor 539, which includes a filter and a front end unit, RF-processes the output signal of the DAC 537 so as to allow the output signal of the DAC 537 to be wirelessly transmitted, and transmits the RF-process result via an antenna.

As stated above, FIG. 5 depicts a block diagram of the transmitter of the OFDM communication system including N Tx antennas. The preamble sequence generator 500 of FIG. 5 will hereinafter be described with reference to FIG. 6.

Figure 6:
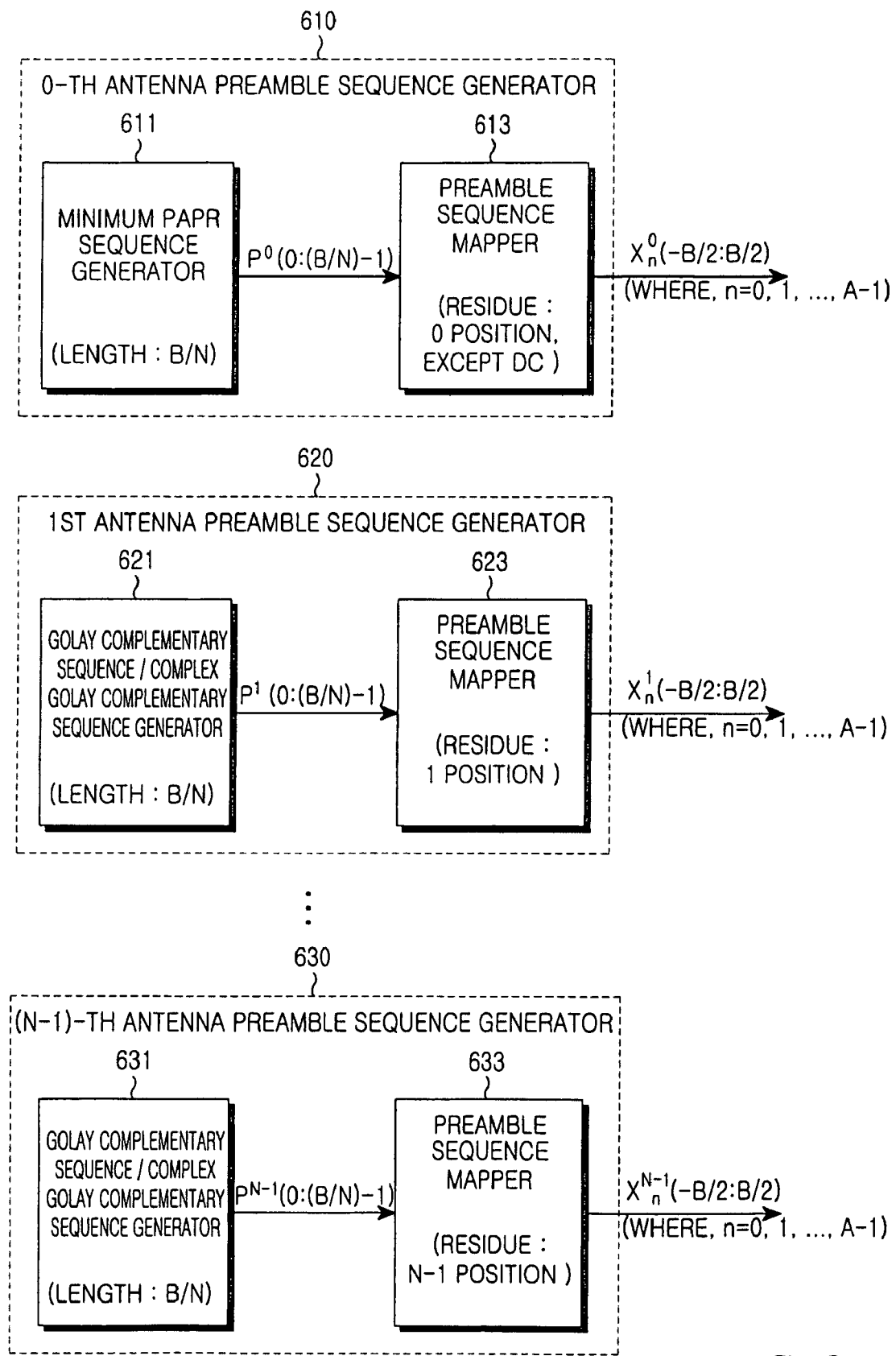
FIG. 6 is a block diagram illustrating a preamble sequence generator shown in FIG. 5.

FIG. 6 is a block diagram illustrating the preamble sequence generator 500 of FIG. 5.

Referring to FIG. 6, the preamble sequence generator 500 includes a 0-th antenna preamble sequence generator 610, a 1st antenna preamble sequence generator 620, to an (N-1)-th antenna preamble sequence generator 630. In this case, the preamble sequence generator 500 includes a plurality of preamble sequence generators equal to the number of the Tx antennas used in the OFDM communication system in the same manner as in FIG. 5. Although the 0-th antenna preamble sequence generator 610 of FIG. 6 and the 0-th antenna preamble sequence generator 517 of FIG. 5 are denoted by different numerals, they are substantially equal to each other in construction and operation. Also, the (N-1)-th antenna preamble sequence generator 630 of FIG. 6 and the (N-1)-th antenna preamble sequence generator 529 are denoted by different numerals, but they are substantially equal to each other.

The preamble sequence mapping regulations according to the present invention will hereinafter be described with reference to FIG. 6.

As previously stated in FIG. 5, B sub-carriers other than a 0-th sub-carrier indicative of a time-domain DC component and the sub-carriers of a high-frequency band required for a guard interval, from among a total of A sub-carriers are adapted as input signals of the IFFT units associated with the individual Tx antennas of the OFDM communication system. Because the number of the Tx antennas of the OFDM communication system is 'N' and the number of sub-carriers used as the input signals of each IFFT unit is 'B', the individual Tx antennas use B/N sub-carriers not overlapped with each other, resulting in an orthogonality between the Tx antennas.

For example, the 0-th antenna transmits a preamble sequence only to sub-carriers each having an N-associated residue '0' of a corresponding sub-carrier index from among the B sub-carriers. In this case, the N-associated residue '0' is represented by 'sub-carrier index % N=0'. Specifically, if the sub-carrier index is divided by 'N', a residue is '0'. Needless to say, a sub-carrier indicative of a time-domain DC component, i.e. an index of the 0-th sub-carrier, is equal to '0', such that it is equal to the sub-carrier having the N-associated residue '0'. However, only the null data must be transmitted to the 0-th sub-carrier, such that the sub-carrier indicative of the time-domain DC component is excluded. Therefore, a mapping length of the real preamble sequence is equal to 'B/N'.

Operations of the preamble sequence generators will hereinafter be described with reference to FIG. 6.

First, the 0-th antenna preamble sequence generator 610 includes a minimum PAPR sequence generator 611 and a preamble sequence mapper 613. The minimum PAPR sequence generator 611 generates a sequence $P^0(0:(B/N)-1)$ of length 'B/N' having a minimum PAPR (e.g., less than 3 dB) after the IFFT unit 521 performs the IFFT process, and outputs the sequence $P^0(0:(B/N)-1)$ to the preamble sequence mapper 613. The preamble sequence mapper 613 receives the sequence $P^0(0:(B/N)-1)$ having the length 'B/N' from the minimum PAPR sequence generator 611, and maps the individual elements of the sequence $P^0(0:(B/N)-1)$ having the length 'B/N' to the sub-carriers each having an N-associated residue '0' of a sub-carrier index. The preamble sequence generated by the mapping operation of the preamble sequence mapper 613 is represented by $X_n^0(-B/2:B/2)$. A sub-carrier distance between the individual elements, each having an N-associated residue '0' of a sub-carrier index, in the preamble sequence $X_n^0(-B/2:B/2)$ is determined to be 'N'.

Second, the 1st antenna preamble sequence generator 620 includes a Golay complementary sequence/Complex Golay complementary sequence generator 621 and a preamble sequence mapper 623. The Golay complementary sequence/Complex Golay complementary sequence generator 621 generates a sequence $P^1(0:(B/N)-1)$ of length 'B/N' having a minimum PAPR (e.g., less than 3 dB) after the IFFT unit 521 of FIG. 5 performs the IFFT process, and outputs the sequence $P^1(0:(B/N)-1)$ to the preamble sequence mapper 623. In this case, the 1st Tx antenna loads a sequence on a sub-carrier position not equal to the N-associated residue '0' of the sub-carrier index, differently from the 0-th Tx antenna, such that it can be recognized that the 1st Tx antenna passes through the preamble sequence mapper 623 and the preamble sequences are mapped at intervals of the same distance. In this way, if the preamble sequences are regularly mapped, a preamble sequence having a PAPR less than 3 dB can be acquired using a Golay complementary sequence. However, the Golay complementary sequence must have a predetermined length $2^\alpha 10^\beta 26^\gamma$ (where, $\alpha$, $\beta$, $\gamma \geq 0$), such that this length requirement of the preamble sequence required for the OFDM communication system may not be satisfied.

Likewise, provided that the usage of the Golay complementary sequence is limited due to the length requirement $2^\alpha 10^\beta 26^\gamma$ (where, $\alpha$, $\beta$, $\gamma \geq 0$), a preamble sequence having a low PAPR can be acquired using a complex Golay complementary sequence. For example, a Complex Golay complementary sequence pair [E, F, G, H] having a length 'L+M' can be generated using the Golay complementary sequence pair [A, B] having a length 'L' and the other Golay complementary sequence pair [C, D] having a length 'M', the length of the complex Golay complementary sequence can be extended to $2^\alpha 10^\beta 26^\gamma$ or $2^{\alpha_1} 10^{\beta_1} 26^{\gamma_1} + 2^{\alpha_2} 10^{\beta_2} 26^{\gamma_2}$ (where $\alpha_1$, $\beta_1$, $\gamma_1$, $\alpha_2$, $\beta_2$, $\gamma_2$, $\geq 0$). The Golay complementary sequence or operations for generating the complex Golay complementary sequence will hereinafter be described with reference to FIG. 8, and therefore their detailed descriptions will herein be omitted for the convenience of description.

The preamble sequence mapper 623 receives the sequence $P^1(0:(B/N)-1)$ having the length 'B/N' from the Golay complementary sequence/Complex Golay complementary sequence generator 621, and maps individual elements of the sequence $P^1(0:(B/N)-1)$ having the length 'B/N' to sub-carriers each having an N-associated residue '1' of a sub-carrier index. The preamble sequence generated by the mapping operation of the preamble sequence mapper 623 is represented by $X_n^0(-B/2:B/2)$. A sub-carrier distance between individual elements, each having an N-associated residue '1' of a sub-carrier index, in the preamble sequence $X_n^1(-B/2:B/2)$ is determined to be 'N'.

In this manner, the (N-1)-th antenna preamble sequence generator 630 indicative of the last preamble sequence generator includes a Golay complementary sequence/Complex Golay complementary sequence generator 631 and a preamble sequence mapper 633. The Golay complementary sequence/Complex Golay complementary sequence generator 631 generates a sequence $P^{N-1}(0:(B/N)-1)$ of length 'B/N', and outputs the sequence $P^{N-1}(0:(B/N)-1)$ to the preamble sequence mapper 633. In this case, $P^{N-1}(0(B/N)-1)$ is indicative of a Golay complementary sequence or a complex Golay complementary sequence according to the length thereof. Also, the (N-1)-th Tx antenna loads a sequence on a sub-carrier position not equal to the N-associated residue '0' of the sub-carrier index, differently from the 0-th Tx antenna, such that it can be recognized that the (N-1)-th Tx antenna passes through the preamble sequence mapper 633 and the preamble sequences are mapped at intervals of the same distance. Therefore, the Golay complementary sequence/complex Golay complementary sequence generator 631 generates a Golay complementary sequence or a complex Golay complementary sequence according to a length condition required by the OFDM communication system, and outputs the generated sequence to the preamble sequence mapper 633. The preamble sequence mapper 633 receives the sequence $P^{N-1}(0:(B/N)-1)$ having the length 'B/N' from the Golay complementary sequence/Complex Golay complementary sequence generator 631, and maps individual elements of the sequence $P^{N-1}(0:(B/N)-1)$ having the length 'B/N' to sub-carriers each having an N-associated residue 'N-1' of a sub-carrier index. The preamble sequence generated by the mapping operation of the preamble sequence mapper 633 is represented by $X_n^{N-1}(-B/2:B/2)$. A sub-carrier distance between individual elements, each having an N-associated residue 'N-1' of a sub-carrier index, in the preamble sequence $X_n^1(-B/2:B/2)$ is determined to be 'N'.

As stated above, FIG. 6 depicts a block diagram of the preamble sequence generator 500 of the OFDM communication system including N Tx antennas. The preamble sequence generator 500 of the OFDM communication system including four Tx antennas will hereinafter be described with reference to FIG. 7.

Figure 7:
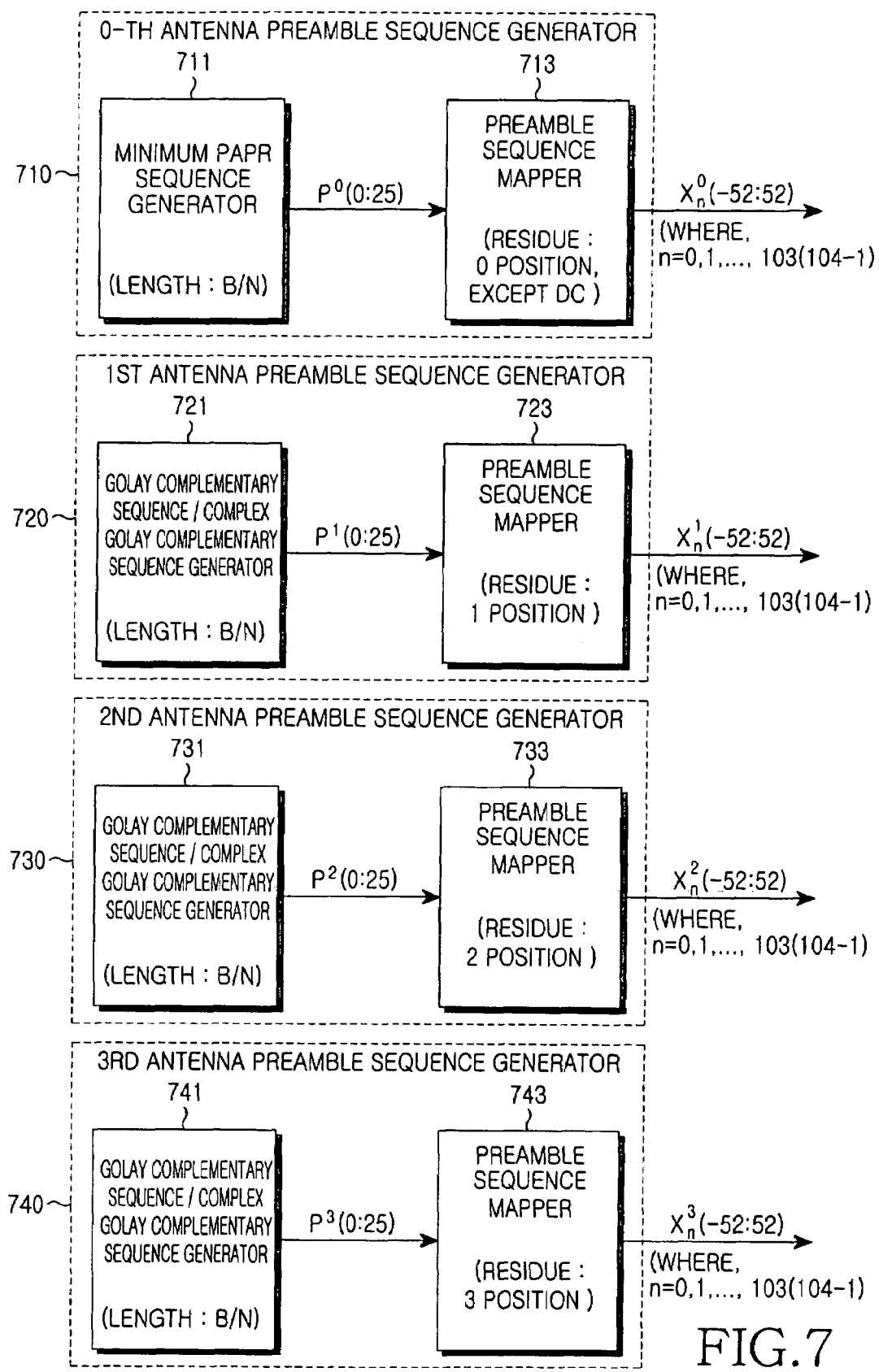
FIG. 7 is a block diagram illustrating a preamble sequence generator using four Tx antennas in accordance with a preferred embodiment of the present invention.

FIG. 7 is a block diagram illustrating the preamble sequence generator 500 using four Tx antennas in accordance with a preferred embodiment of the present invention.

Prior to describing FIG. 7, preamble sequence mapping regulations for the OFDM communication system including four Tx antennas will hereinafter be described.

Provided that the OFDM communication system of FIG. 5 uses four Tx antennas, the number of Tx antennas is 4. Therefore, assuming that the number of all the sub-carriers of IFFT units corresponding to the respective Tx antennas is 128, and only 104 sub-carriers other than the 0-th sub-carrier (indicative of a DC component in a time domain) and sub-carriers of a high-frequency band are used, the preamble sequence mapping regulations will be described. Because the number of Tx antennas is 3 and the number of available sub-carriers is 104, the individual Tx antennas use 26 sub-carriers not overlapped with each other, resulting in an orthogonality between the Tx antennas. For example, the 0-th antenna transmits a preamble sequence to the sub-carriers each having a 4-associated residue '0' of a sub-carrier index from among the 104 sub-carriers, as shown in FIG. 7. Therefore, the length of the preamble sequence mapped to the sub-carriers each having a 4-associated residue '0' of a real sub-carrier index is determined to be 26.

Prior to describing FIG. 7, it is noted that the preamble sequence generators of FIG. 7 are the same as preamble sequence generators of FIGS. 5 and 6. The preamble sequence has different lengths according to the number of the Tx antennas and the number of all of the sub-carriers. The operations of the preamble sequence generators will now be described with reference to FIG. 7.

First, the 0-th antenna preamble sequence generator 710 includes a minimum PAPR sequence generator 711 and a preamble sequence mapper 713. The minimum PAPR sequence generator 711 generates a sequence $P^0(0:25)$ of length '26(104/4)' having a minimum PAPR, and outputs the sequence $P^0(0:25)$ to the preamble sequence mapper 713. The preamble sequence mapper 713 receives the sequence $P^0(0:25)$ having the length '26' from the minimum PAPR sequence generator 711, and maps the individual elements of the sequence $P^0(0:25)$ having the length '26' to the sub-carriers each having a 4-associated residue '0' of a sub-carrier index. The preamble sequence generated by the mapping operation of the preamble sequence mapper 713 is represented by "$X_n^0(-52:52)$ ($X_n^0(-104/2:104/2)$)". A sub-carrier distance between the individual elements, each having a 4-associated residue '0' of a sub-carrier index, in the preamble sequence $X_n^0(-52:52)$ is determined to be '4'.

Second, the 1st antenna preamble sequence generator 720 includes a Golay complementary sequence/Complex Golay complementary sequence generator 721 and a preamble sequence mapper 723. The Golay complementary sequence/Complex Golay complementary sequence generator 721 generates a sequence $P^1(0:25)$ of the length '26', and outputs the sequence $P^1(0:25)$ to the preamble sequence mapper 723. The sequence form generated by the Golay complementary sequence/Complex Golay complementary sequence generator 721 is determined by the preamble sequence length and the requirements of the OFDM communication system. The Golay complementary sequence/Complex Golay complementary sequence generator 721 generates the sequence of the length '26', such that it can generate a Golay complementary sequence. The Golay complementary sequence of the length '26' can be represented by the following expression:

$$P^1(0:25) = \{+1+1+1+1-1+1+1-1-1+1-1+\\ 1-1+1-1-1+1-1+1+1+1-1-1+1+1+1\}$$

A method for generating the Golay complementary sequence $P^1(0:25)$ of length '26' will be described with reference to FIG. 9, and its detailed description will herein be omitted for the convenience of description.

The preamble sequence mapper 723 receives the sequence $P^1(0:25)$ having the length '26' from the Golay complementary sequence/Complex Golay complementary sequence generator 721, and maps individual elements of the sequence $P^1(0:25)$ having the length '26' to sub-carriers each having a 4-associated residue '1' of a sub-carrier index. The preamble sequence generated by the mapping operation of the preamble sequence mapper 723 is represented by $X_n^1(-52:52)$. A sub-carrier distance between the individual elements, each having a 4-associated residue '1' of a sub-carrier index, in the preamble sequence $X_n^1(-52:52)$ is determined to be '4'. In this case, the preamble sequence $X_n^1(-52:52)$ can be represented by the following expression:

$$X_n^1(-52:52) =$$
$$\{0+1000+1000+1000+1000-1000+1000+1000-$$
$$1000-1000+1000-1000+1000-1000+$$
$$1000-1000-1000+1000-1000+1000+$$
$$1000+1000-1000-1000+1000+1000+100\}$$

Third, the 2nd antenna preamble sequence generator 730 includes a Golay complementary sequence/Complex Golay complementary sequence generator 731 and a preamble sequence mapper 733. The Golay complementary sequence/Complex Golay complementary sequence generator 731 generates a sequence $P^2(0:25)$ of the length '26' to function as a Golay complementary sequence or a complex Golay complementary sequence, and outputs the sequence $P^2(0:25)$ to the preamble sequence mapper 733. The preamble sequence mapper 733 receives the sequence $P^2(0:25)$ having the length '26' from the Golay complementary sequence/Complex Golay complementary sequence generator 731, and maps individual elements of the sequence $P^2(0:25)$ having the length '26' to sub-carriers each having a 4-associated residue '1' of a sub-carrier index. In this case, it is assumed that $P^2(0:25)$ is indicative of a Golay complementary sequence which is equal to $P^1(0:25)$ generated by the aforementioned Golay complementary sequence/Complex Golay complementary sequence generator 721. The preamble sequence generated by the mapping operation of the preamble sequence mapper 733 is represented by $X_n^2(-52:52)$. A sub-carrier distance between the individual elements, each having a 4-associated residue '2' of a sub-carrier index, in the preamble sequence $X_n^2(-52:52)$ is determined to be '4'. In this case, the preamble sequence $X_n^2(-52:52)$ can be represented by the following expression:

$$X_n^2(-52:52) =$$
$$\{00+1000+1000+1000+1000-1000+1000+1000-$$
$$1000-1000+1000-1000+1000-1000+$$
$$1000-1000-1000+1000-1000+1000+$$
$$1000+1000-1000-1000+1000+1000+10\}$$

Final, the 3rd antenna preamble sequence generator 740 includes a Golay complementary sequence/Complex Golay complementary sequence generator 741 and a preamble sequence mapper 743. The Golay complementary sequence/Complex Golay complementary sequence generator 741 generates a sequence $P^3(0:25)$ of length '26' to function as a Golay complementary sequence or a complex Golay complementary sequence, and outputs the sequence $P^3(0:25)$ to the preamble sequence mapper 743. In this case, it is assumed that $P^3(0:25)$ is indicative of a Golay complementary sequence which is equal to $P^1(0:25)$ and $P^2(0:25)$ generated by the aforementioned Golay complementary sequence/Complex Golay complementary sequence generator 721. The preamble sequence mapper 743 receives the sequence $P^3(0:25)$ having the length '26' from the Golay complementary sequence/Complex Golay complementary sequence generator 741, and maps the individual elements of the sequence $P^3(0:25)$ having the length '26' to sub-carriers each having a 4-associated residue '3' of a sub-carrier index. The preamble sequence generated by the mapping operation of the preamble sequence mapper 743 is represented by $X_n^3(-52:52)$. A sub-carrier distance between individual elements, each having a 4-associated residue '3' of a sub-carrier index, in the preamble sequence $X_n^3(-52:52)$ is determined to be '4'. In this case, the preamble sequence $X_n^3(-52:52)$ can be represented by the following expression:

$$X_n^3(-52:52) =$$
$$\{000+1000+1000+1000+1000-1000+1000+$$
$$1000-1000-1000+1000-1000+1000-1000+$$
$$1000-1000-1000+1000-1000+1000+$$
$$1000+1000-1000-1000+1000+1000+1\}$$

In this case, if the IFFT process is applied to preamble sequences, i.e. $X_n^1(-52:52)$, $X_n^2(-52:52)$, and $X_n^3(-52:52)$, to be transmitted over the 1st to 3rd antennas, the PAPR is determined to be 1.9010 dB.

FIG. 7 depicts a preamble sequence generation process of the OFDM communication system including four Tx antennas. The Golay complementary sequence/Complex Golay complementary sequence generator described in FIGS. 6 and 7 will be described with reference to FIG. 8.

Figure 8:
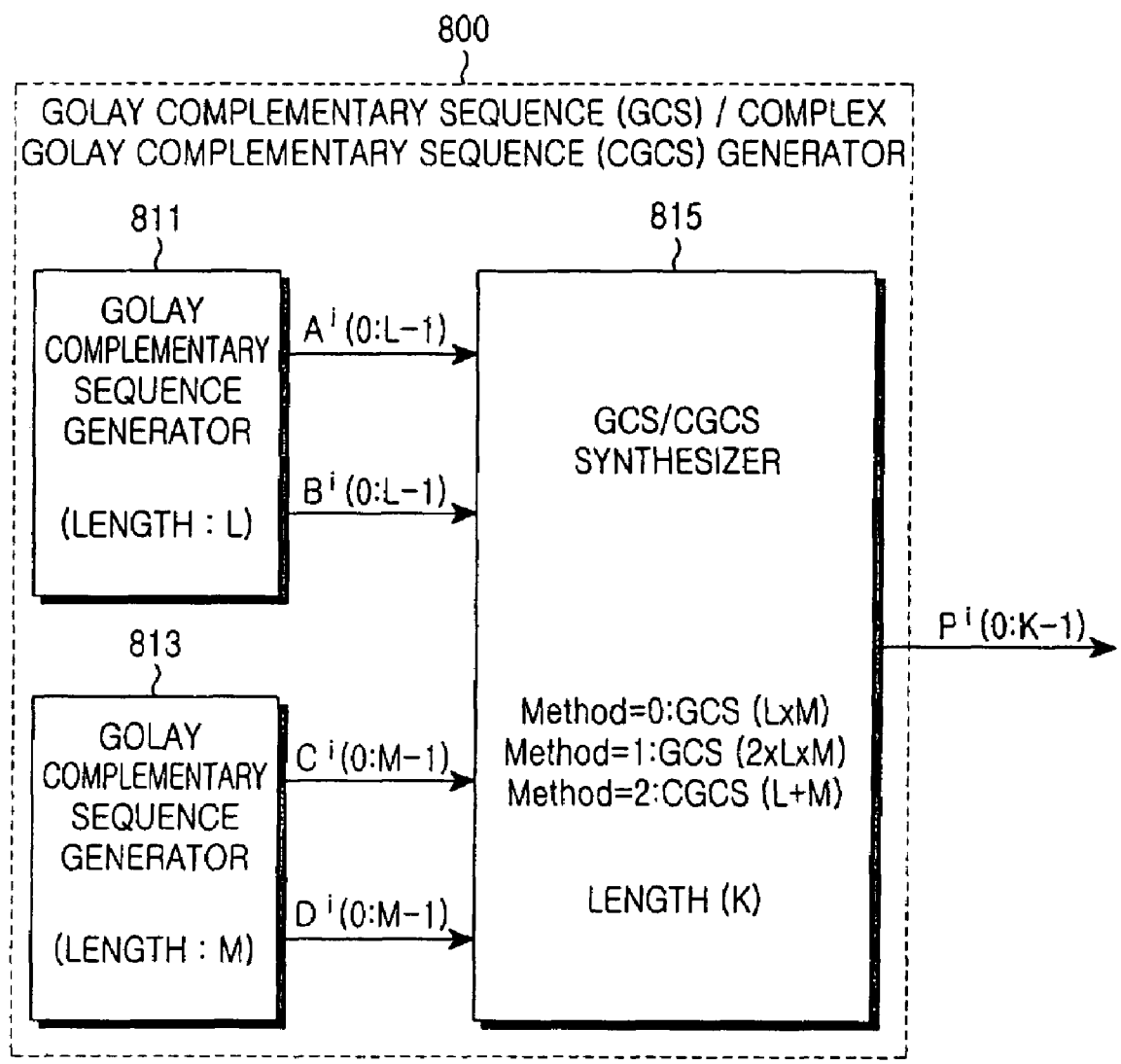
FIG. 8 is a block diagram illustrating an internal configuration of a Golay complementary sequence/Complex Golay complementary sequence generator in accordance with a preferred embodiment of the present invention.

FIG. 8 is a block diagram illustrating an internal configuration of the Golay complementary sequence/Complex Golay complementary sequence generator in accordance with a preferred embodiment of the present invention.

Prior to describing FIG. 8, although the Golay complementary sequence/Complex Golay complementary sequence generator 800 of FIG. 8 and other Golay complementary sequence/Complex Golay complementary sequence generators shown in FIGS. 6 and 7 are denoted by different numerals, they are substantially equal to each other in construction and operation. The Golay complementary sequence/Complex Golay complementary sequence generator 800 includes Golay complementary sequence generators 811 and 813, and a Golay complementary sequence/Complex Golay complementary sequence synthesizer 815.

Referring to FIG. 8, the Golay complementary sequence/Complex Golay complementary sequence generator 800 generates a Golay complementary sequence when the length of a sequence to be generated by the OFDM communication system is $2^\alpha 10^\beta 26^\gamma$ (where α, β, γ≧0). If the length of the sequence to be generated is $2^{\alpha_1}10^{\beta_1}26^{\gamma_1}+2^{\alpha_2}10^{\beta_2}26^{\gamma_2}$ (where $\alpha_1$, $\beta_1$, $\gamma_1$, $\alpha_2$, $\beta_2$, $\gamma_2$, ≧0), the Golay complementary sequence/Complex Golay complementary sequence generator 800 generates a complex Golay complementary sequence. As stated above, because the PAPR characteristics of the Golay complementary sequence are the best, the Golay complementary sequence/Complex Golay complementary sequence generator 800 first generates the Golay complementary sequence according to a predetermined condition for determining if a preamble sequence to be generated coincides with the length condition, and then generates the complex Golay complementary sequence.

If the Golay complementary sequence/Complex Golay complementary sequence generator 800 generates the Golay complementary sequence, it is able to generate a Golay complementary sequence of length 'L×M' or '2×L×M' using a Golay complementary sequence of length 'L' and the other Golay complementary sequence of length 'M'. A method for generating the Golay complementary sequence of length 'L×M' or '2×L×M' will now be described.

The Golay complementary sequence generator 811 generates a Golay complementary sequence pair of length 'L', and outputs the Golay complementary sequence pair of length 'L' to the Golay complementary sequence/Complex Golay complementary sequence synthesizer 815. In this case, it should be noted that the Golay complementary sequence pair generated by the Golay complementary sequence generator 811 will be referred to as [$A^i(0:L-1)$, $B^i(0:L-1)$]. The Golay complementary sequence generator 813 generates a Golay complementary sequence pair of length 'M', and outputs the Golay complementary sequence pair of length 'M' to the Golay complementary sequence/Complex Golay complementary sequence synthesizer 815. In this case, it should be noted that the Golay complementary sequence pair generated by the Golay complementary sequence generator 813 will be referred to as [$C^i(0:M-1)$, $D^i(0:M-1)$]. Also, the Golay complementary sequence generator 811 uses the Golay complementary sequence of length 'L', and the Golay complementary sequence generator 813 uses the Golay complementary sequence of length 'M', without using additional synthesis regulations.

The Golay complementary sequence/Complex Golay complementary sequence synthesizer 815 receives the Golay complementary sequence pair [$A^i(0:L-1)$, $B^i(0:L-1)$] having the length 'L' from the Golay complementary sequence generator 811, and receives the Golay complementary sequence pair [$C^i(0:M-1)$, $D^i(0:M-1)$] having the length 'M' from the Golay complementary sequence generator 813. The Golay complementary sequence pair [$A^i(0:L-1)$, $B^i(0:L-1)$] having the length 'L' is synthesized with the Golay complementary sequence pair [$C^i(0:M-1)$, $D^i(0:M-1)$], such that a Golay complementary sequence of length 'K' or a complex Golay complementary sequence of length 'K' is generated. In this case, 'K' may be determined to be either one of 'L×M', '2×L×M', and 'L+M', and a sequence of length 'K' generated by the Golay. complementary sequence/Complex Golay complementary sequence synthesizer 815 is determined to be $P^i(0:K-1)$.

A method for controlling the Golay complementary sequence/Complex Golay complementary sequence synthesizer 815 to generate the Golay complementary sequence of length 'K' or the complex Golay complementary sequence of length 'K' by synthesizing the Golay complementary sequence pair [$A^i(0:L-1)$, $B^i(0:L-1)$] of length 'L' and the Golay complementary sequence pair [$C^i(0:M-1)$, $D^i(0:M-1)$] of length 'M' will hereinafter be described.

The Golay complementary sequence/Complex Golay complementary sequence synthesizer 815 uses three synthesis regulations according to length information of a sequence to be generated, such that a Golay complementary sequence or a complex Golay complementary sequence is generated. In this case, a variable indicative of the synthsization regulations is called a 'Method'. First, in the case of using the first synthesis regulation, i.e. in the case of the 'Method=0', the Golay complementary sequence/Complex Golay complementary sequence synthesizer 815 synthesizes a Golay complementary sequence of the length 'L×M'. In this case, the process for synthesizing the Golay complementary sequence of the length 'L×M' is not directly associated with the present invention, such that its detailed description will herein be omitted for the convenience of description. Second, in the case of using the second synthesis regulation, i.e. in the case of the 'Method=1', the Golay complementary sequence/Complex Golay complementary sequence synthesizer 815 synthesizes a Golay complementary sequence of length '2×L×M'. In this case, the process for synthesizing the Golay complementary sequence of length '2×L×M' is not directly associated with the present invention, such that its detailed description will herein be omitted for the convenience of description. Third, in the case of using the third synthesis regulation, i.e. in the case of the 'Method=2', the Golay complementary sequence/Complex Golay complementary sequence synthesizer 815 synthesizes a complex Golay complementary sequence of length 'L+M'. In this case, the process for synthesizing the complex Golay complementary sequence of length 'L+M' is not directly associated with the present invention, such that its detailed description will herein be omitted for the convenience of description.

A method for generating a Golay complementary sequence of the length '26' will be described with reference to FIG. 9.

Figure 9:
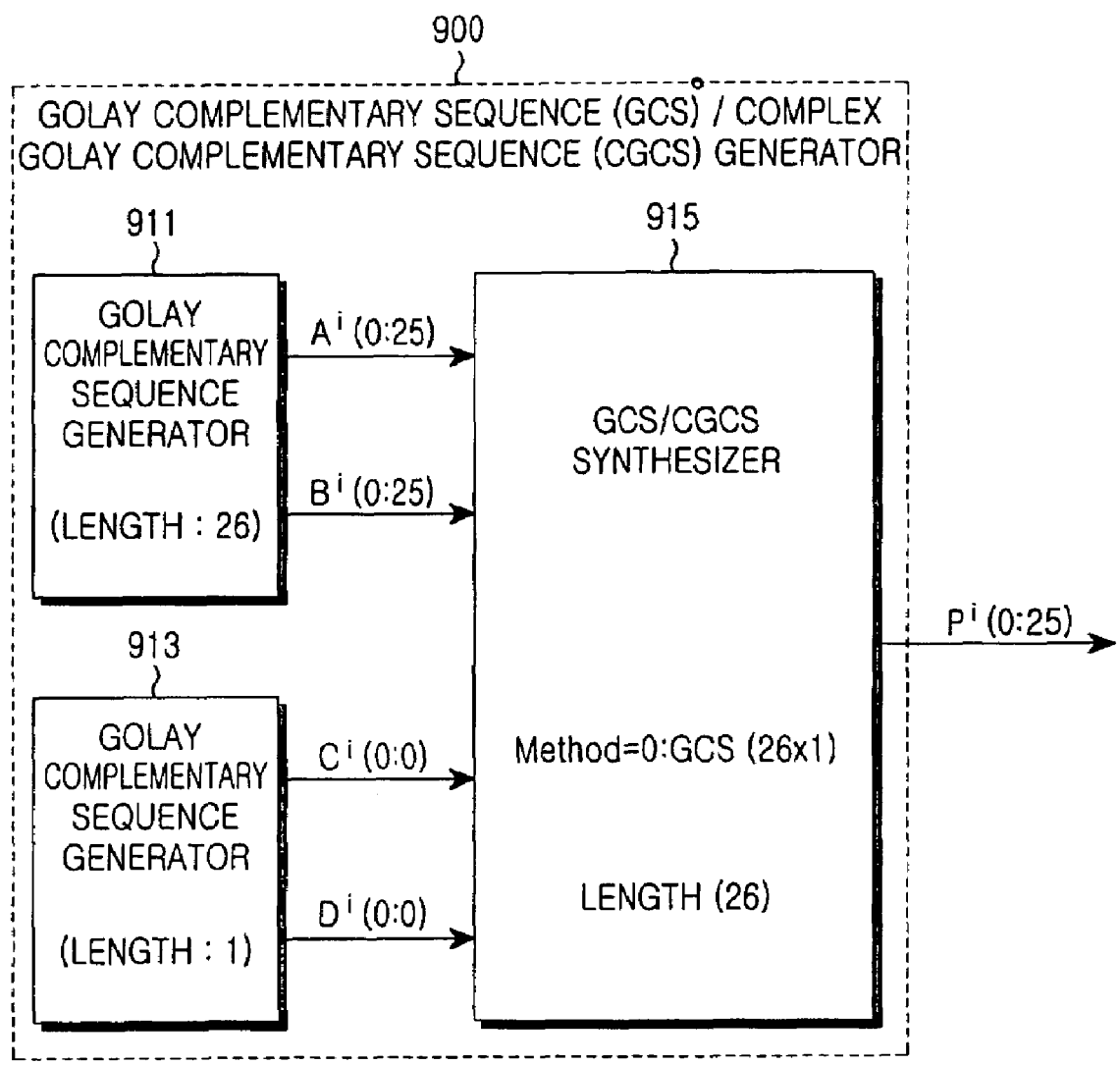
FIG. 9 is a block diagram illustrating the internal configuration of a Golay complementary sequence/Complex Golay complementary sequence generator capable of generating a Golay complementary sequence having a length of '26' in accordance with a preferred embodiment of the present invention.

FIG. 9 is a block diagram illustrating the internal configuration of a Golay complementary sequence/Complex Golay complementary sequence generator capable of generating a Golay complementary sequence having a length '26' in accordance with a preferred embodiment of the present invention.

Prior to describing FIG. 9, although the Golay complementary sequence/Complex Golay complementary sequence generator 900 of FIG. 9 and the aforementioned Golay complementary sequence/Complex Golay complementary sequence generator 800 of FIG. 8 are denoted by different numerals, they are substantially equal to each other in construction and operation. The Golay complementary sequence/Complex Golay complementary sequence generator 900 includes Golay complementary sequence generators 911 and 913, and a Golay complementary sequence/Complex Golay complementary sequence synthesizer 915.

FIG. 9 shows an exemplary case in which a Golay complementary sequence of the length '26' is generated using a Golay complementary sequence of the length '26' and a Golay complementary sequence of length '1'. The Golay complementary sequence generator 911 generates a Golay complementary sequence pair [$A^i(0:25)$, $B^i(0:25)$] of the length '26', and outputs the Golay complementary sequence pair [$A^i(0:25)$, $B^i(0:25)$] to the Golay complementary sequence/Complex Golay complementary sequence synthesizer 915. In this case, the Golay complementary sequence pair [$A^i(0:25)$, $B^i(0:25)$] of the length 26 can be represented by the following expression:

$$A^i(0:25) = \{+1+1+1+1-1+1+1-1-1+1-1+$$
$$1-1+1-1-1+1-1+1+1+1-1-1+1+1+1\}$$
$$B^i(0:25) = \{+1+1+1+1-1+1+1-1-1+1-1+1-$$
$$1+1+1+1-1+1-1-1-1+1+1-1-1-1\}$$

The Golay complementary sequence generator 913 generates a Golay complementary sequence pair [$C^i(0:0)$, $D^i(0:0)$] of the length '1', and outputs the Golay complementary sequence pair [$C^i(0:0)$, $D^i(0:0)$] to the Golay complementary sequence/Complex Golay complementary sequence synthesizer 915. The Golay complementary sequence/Complex Golay complementary sequence synthesizer 915 generates a Golay complementary sequence pair of the length '26' using the first synthesis regulation (Method=0). The Golay complementary sequence/Complex Golay complementary sequence synthesizer 915 selects a Golay complementary sequence having a minimum PAPR from among Golay complementary sequence pairs, each having a length '26', using the first synthesis regulation. In this case, the Golay complementary sequence $P^i(0{:}25)$ of the length '26' generated by the Golay complementary sequence/Complex Golay complementary sequence synthesizer 915 can be represented by the following expression:

$$P^i(0:25) = \{+1+1+1+1+1-1+1+1-1-1+1-1+$$
$$1-1+1-1-1+1-1+1+1+1-1-1+1+1+1\}$$

A preamble sequence mapping process according to the present invention will hereinafter be described with reference to FIG. 10.

Figure 10:
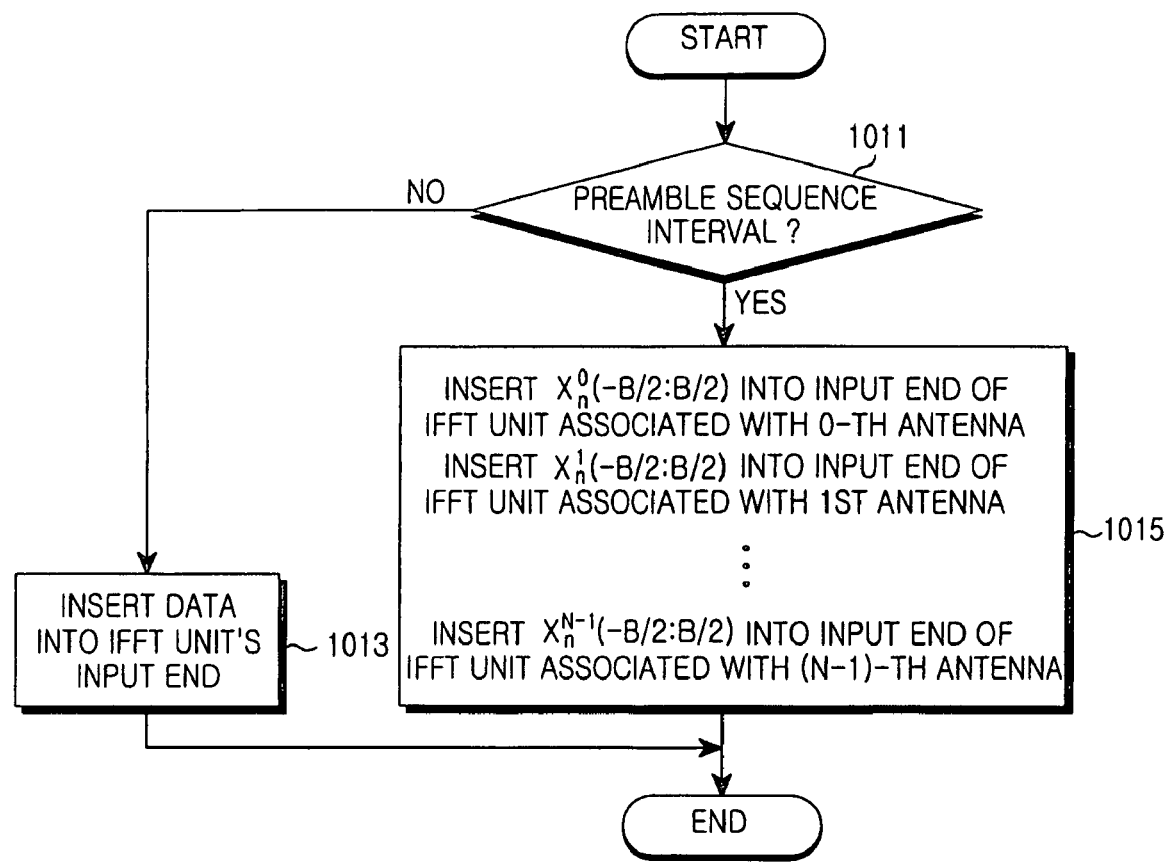
FIG. 10 is a flow chart illustrating a preamble sequence mapping process in accordance with a preferred embodiment of the present invention.

FIG. 10 is a flow chart illustrating the preamble sequence mapping process in accordance with a preferred embodiment of the present invention.

Referring to FIG. 10, a transmitter for the OFDM communication system determines if a signal interval to be transmitted is equal to a preamble sequence transmission interval at step 1011. If it is determined that the signal interval to be transmitted is not equal to the preamble sequence transmission interval, i.e. if the signal interval is equal to a data transmission interval, the transmitter goes to step 1013. The transmitter controls transmission data to be mapped to the corresponding sub-carriers of an input end of an IFFT unit at step 1013. When there are some data have to be transmitted the transmitter returns to step 1011, or else it terminates the mapping process.

In the meantime, if it is determined that the signal interval to be transmitted is equal to the preamble sequence transmission interval at step 1011, the transmitter goes to step 1015. The transmitter maps $X_n^0(-B/2{:}B/2)$ as an input signal of a corresponding IFFT unit associated with the 0-th antenna. The transmitter maps $X_n^1(-B/2{:}B/2)$ as an input signal of a corresponding IFFT unit associated with the 1st antenna. In this manner, the transmitter maps $X_n^{N-1}(-B/2{:}B/2)$ as an input signal of a corresponding IFFT unit corresponding to the (N-1)-th antenna equal to the last antenna.

In this way, the transmitter for the OFDM communication system transmits a preamble sequence over each Tx antenna, such that a reception end can maximize the channel estimation efficiency.

A preamble sequence mapping process when a preamble sequence of length '104' is used will hereinafter be described with reference to FIG. 11.

Figure 11:
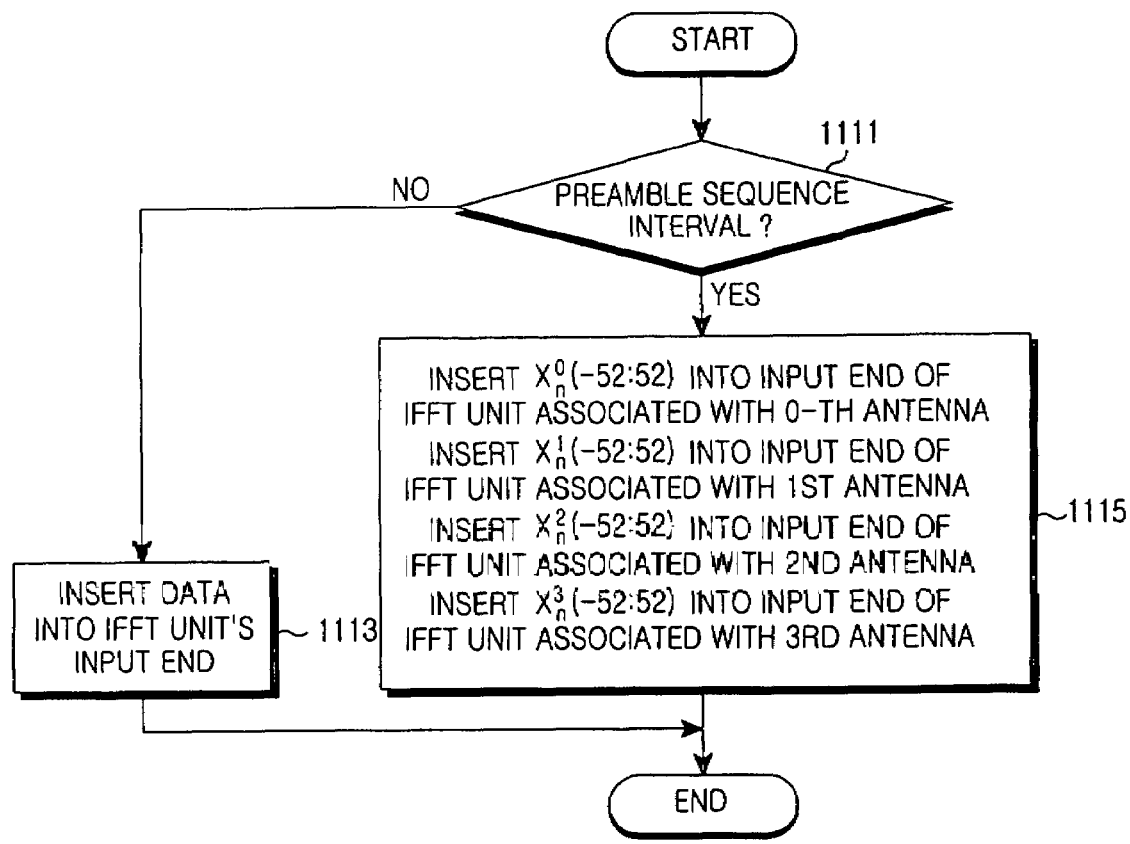
FIG. 11 is a flow chart illustrating a method for mapping a preamble sequence having a length of '104' in an OFDM communication system including four Tx antennas in accordance with a preferred embodiment of the present invention.

FIG. 11 is a flow chart illustrating a method for mapping the preamble sequence having the length '104' in the OFDM communication system including four Tx antennas in accordance with a preferred embodiment of the present invention.

Referring to FIG. 11, a transmitter for the OFDM communication system determines if a signal interval to be transmitted is equal to a preamble sequence transmission interval at step 1111. If it is determined that the signal interval to be transmitted is not equal to the preamble sequence transmission interval, i.e. if the signal interval is equal to a data transmission interval, the transmitter goes to step 1113. The transmitter controls transmission data to be mapped to corresponding sub-carriers of an input end of an IFFT unit at step 1113. When there are some data have to be transmitted the transmitter returns to step 1111, or else it terminates the mapping process.

In the meantime, if it is determined that the signal interval to be transmitted is equal to the preamble sequence transmission interval at step 1111, the transmitter goes to step 1115. The transmitter maps $X_n^0(-52{:}52)$ as an input signal of a corresponding IFFT unit associated with the 0-th antenna. The transmitter maps $X_n^1(-52{:}52)$ as an input signal of a corresponding IFFT unit associated with the 1st antenna, maps $X_n^2(-52{:}52)$ as an input signal of a corresponding IFFT unit associated with the 2nd antenna, maps $X_n^3(-52{:}52)$ as an input signal of a corresponding IFFT unit associated with the 3rd antenna, and then terminates the mapping process.

In this way, the transmitter for the OFDM communication system transmits a preamble sequence over each Tx antenna, such that a reception end can maximize the channel estimation efficiency.

A channel estimation process of the OFDM communication system including N Tx antennas and M Rx antennas will be described with reference to FIG. 12.

Figure 12:
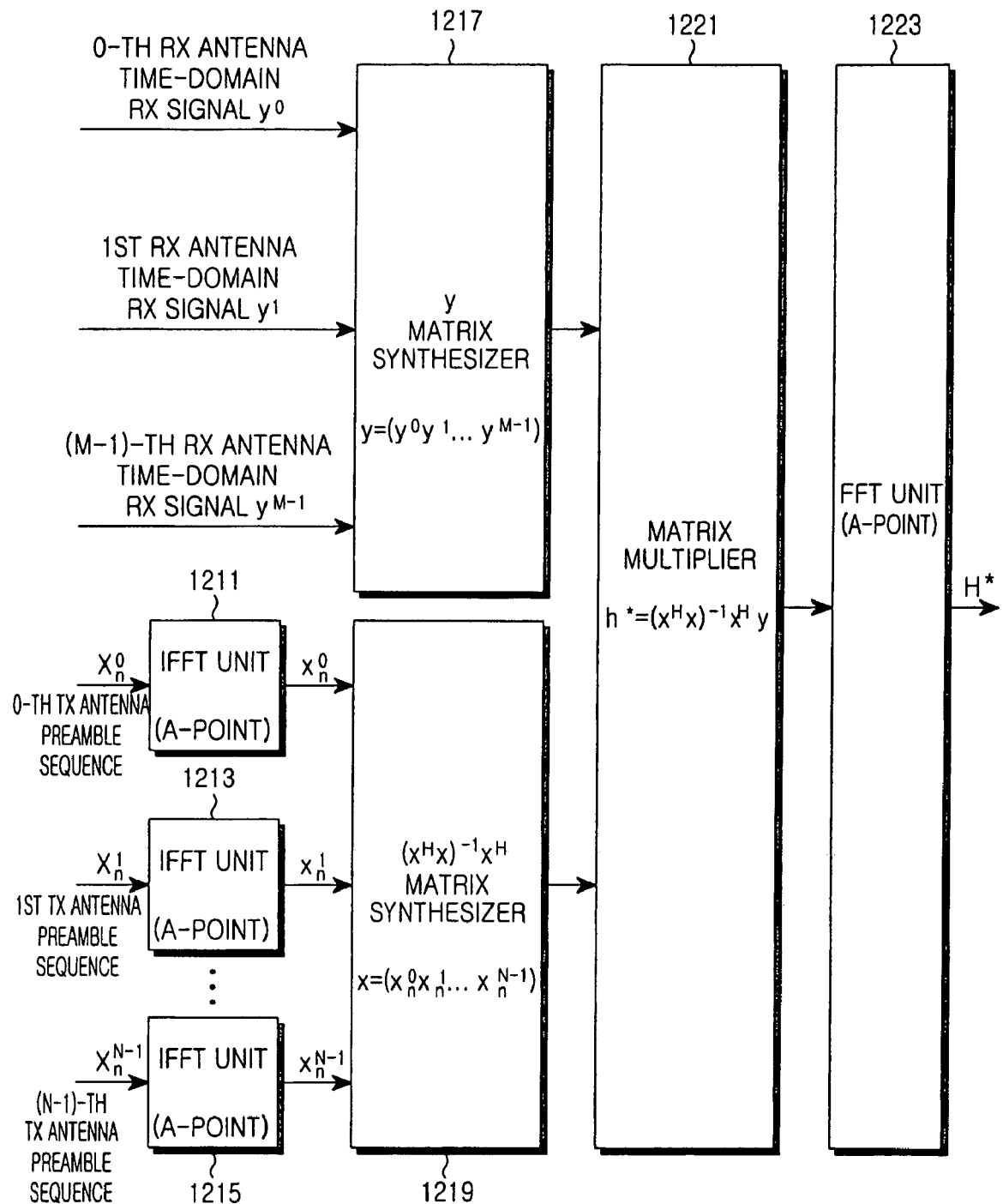
FIG. 12 is a block diagram illustrating the internal configuration of a channel estimator for use in an OFDM communication system including N Tx antennas and M Rx (Reception) antennas in accordance with a preferred embodiment of the present invention.

FIG. 12 is a block diagram illustrating the internal configuration of the channel estimator for use in the OFDM communication system including N Tx antennas and M Rx antennas in accordance with a preferred embodiment of the present invention.

Prior to describing FIG. 12, although 'M' is indicative of the number of the Rx antennas and another 'M' is indicative of length of the Golay complementary sequence are denoted by the same variable, it should be noted that they are substantially independent of each other. In more detail, the value 'M' that is indicative of the number of the Rx antennas may be equal or not equal to another value of another 'M' that is indicative of length of the Golay complementary sequence, such that there is no connection between the above two Ms. A time-domain signal generated from the individual Tx antennas of the OFDM communication system's transmitter can be represented by the following Equation 4:

$$X_n^t = \frac{1}{\sqrt{A}} \sum_{k=0}^{A-1} X_k^t e^{j\frac{2\pi nk}{A}}, \quad (4)$$

where $n = 0, 1, \ldots, A-1, t = 0, 1, \ldots, M-1$

With reference to Equation 4, $X_k^t$ is indicative of a preamble sequence transmitted over the t-th Tx antenna. If the preamble sequence. $X_k^t$ passes a channel and is received over the m-th Rx antenna, a time-domain signal is generated. This time-domain signal can be represented by the following Equation 5:

$$y_n^m = \sum_{t=0}^{M-1} \sum_{q=0}^{Q-1} X_{(n-1) \bmod N}^t h_p^{tm} + z_n^m \quad (5)$$

With reference to Equation 5, $h_p^{tm}$ is indicative of a time-domain channel response between the t-th Tx antenna and the m-th Rx antenna, $z_n^m$ is indicative of a time-domain AWGN (Additive White Gaussian Noise) between the t-th Tx antenna and the m-th Rx antenna, and Q is indicative of the number of multipaths of a channel.

If Equation 5 is converted into matrix form, the resultant equation can be represented by the following Equation 6:

$$y = xh + z \tag{6}$$

With reference to Equation 6, the reference character 'y' is denoted by $y=(y^0\ y^1 \ldots y^{M-1})$ and $y^m=(y_0^m\ y_1^m \ldots y_{A-1}^m)^T$, here $(\bullet)^T$ is indicative of a transpose matrix. The reference character 'z' is denoted by $z=(z^0\ z^1 \ldots z^{M-1})$ and $z^m=(z_0^m\ z_1^m \ldots z_{A-1}^m)^T$. The reference character 'x' can be represented by the following Equation 7:

$$x = (x^0\ x^1 \ldots x^{N-1}) \tag{7}$$

$$x^t = \begin{pmatrix} x_0^t & x_{A-1}^t & \cdots & x_{A-Q+1}^t \\ x_1^t & x_0^t & \cdots & x_{A-Q+2}^t \\ \vdots & \vdots & \ddots & \vdots \\ x_{A-1}^t & x_{A-2}^t & \cdots & x_{A-Q}^t \end{pmatrix}$$

The time-domain channel response matrix h can be represented by the following Equation 8:

$$h = \begin{pmatrix} h^{00} & h^{01} & \cdots & h^{0(M-1)} \\ h^{10} & h^{11} & \cdots & h^{1(M-1)} \\ \vdots & \vdots & \ddots & \vdots \\ h^{(N-1)0} & h^{(N-1)1} & \cdots & h^{(N-1)(M-1)} \end{pmatrix}, h^{tm} = \begin{pmatrix} h_0^{tm} \\ h_1^{tm} \\ \vdots \\ h_{Q-1}^{tm} \end{pmatrix} \tag{8}$$

In this case, if an ML (Maximum Likehood) channel estimation process is performed to achieve the optimum channel estimation performance, the channel estimation result can be represented by the following Equation 9:

$$h^* = (x^H x)^{-1} x^H y \tag{9}$$

With reference to Equation 9, $(\bullet)^H$ is indicative of a Hermitian matrix, and h* is indicative of a channel response in a real time domain. A real channel equalization process is performed in a frequency domain, such that a channel response in a frequency domain after performing the FFT process can be represented by the following Equation 10:

$$H^{tm*} = W_Q h^{tm*}$$

$$H = \begin{pmatrix} H^{00} & H^{01} & \cdots & H^{0(m-1)} \\ H^{10} & H^{11} & \cdots & H^{1(M-1)} \\ \vdots & \vdots & \ddots & \vdots \\ H^{(N-1)0} & H^{(N-1)1} & \cdots & H^{(N-1)(M-1)} \end{pmatrix} \tag{10}$$

$[W_Q]_{p,q}$ is denoted by $$[W_Q]_{p,q} = e^{-j\frac{2\pi pq}{A}} \ (A \times Q)$$

matrix.

As described above, the present invention performs channel estimation using a time-domain channel response, such that it can correctly perform the channel estimation even though the preamble sequences transmitted over the individual Tx antennas do not use all of the sub-carriers of the OFDM communication system. Also, the present invention performs channel estimation in the time domain, such that it can perform the correct channel estimation without a performance deterioration caused by interpolation.

Referring to FIG. 12, the channel estimator includes M IFFT units (i.e. M IFFT units 1211~1215), two matrix synthesizers 1217 and 1219, a matrix multiplier 1221, and an FFT unit 1223. The 0-th antenna preamble sequence $X_n^0$ transmitted over the 0-th Tx antenna is transmitted to the IFFT unit 1211. The IFFT unit 1211 performs an IFFT process on the 0-th antenna preamble sequence $X_n^0$, such that it generates $x_n^0$. In this case, the preamble sequences transmitted from the Node B are predetermined between the Node B and the UE, $X_n^{N-1}$ is indicative of an (N-1)-th antenna preamble sequence in a frequency domain transmitted over the (N-1)-th Tx antenna, and $x_n^{N-1}$ is indicative of an (N-1)-th antenna preamble sequence in a time domain where the (N-1)-th antenna preamble sequence in the frequency domain is IFFT-processed. The 1st antenna preamble sequence $X_n^1$ transmitted from the Node B over the 1st Tx antenna is transmitted to the IFFT unit 1213. The IFFT unit 1213 performs an IFFT process on the 1st antenna preamble sequence $X_n^1$, such that it generates $x_n^1$. In this manner, the (N-1)-th antenna preamble sequence $X_n^{N-1}$ transmitted from the Node B over the (N-1)-th Tx antenna is transmitted to the IFFT unit 1215. The IFFT unit 1215 performs an IFFT process on the (N-1)-th antenna preamble sequence $X_n^{N-1}$, such that it generates $x_n^{N-1}$.

In the meantime, the matrix synthesizer 1217 synthesizes the matrix y using the time-domain reception signals received over each of the M Rx antennas, i.e. the time-domain reception signals from a time-domain reception signal $y^0$ received over the 0-th Rx antenna to a time-domain reception signal $y^{M-1}$ received over the (M-1)-th Rx antenna, such that it outputs the synthesized result to the matrix multiplier 1221. In this case, the matrix y is $y=(y^0\ y^1 \ldots y^{M-1})$. The matrix synthesizer 1219 receives the output signals $x_n^0 \sim x_n^{N-1}$ from the IFFT units 1211~1215, synthesizes the matrix $(x^H x)^{-1} x^H$, and outputs the synthesized result to the matrix multiplier 1221. In this case, x is $x=(x^0\ x^1 \ldots x^{N-1})$.

The matrix multiplier 1221 receives the output matrix y of the matrix synthesizer 1217 and the output matrix $(x^H x)^{-1} x^H$ of the matrix synthesizer 1219, multiplies the matrix y by the matrix $(x^H x)^{-1} x^H$, and outputs the multiplied result to the FFT unit 1223. In this case, the multiplied value of the matrix multiplier 1221 is a channel response estimation value in a time domain, and is denoted by $h^*=(x^H x)^{-1} x^H$. The FFT unit 1223 receives the channel response estimation value $h^*=(x^H x)^{-1} x^H y$ in the time domain from the matrix multiplier 1221, and performs the FFT process on the received channel response estimation value $h^*=(x^H x)^{-1} x^H y$, such that it acquires a channel response estimation value H* in a frequency domain.

As apparent from the above description, the present invention allows an OFDM communication system using a plurality of Tx antennas to generate a preamble sequence having a minimum PAPR, such that it can improve the overall performance of the OFDM communication system. The present invention transmits a preamble sequence over each of the Tx antennas, such that a receiver can perform the correct channel estimation. Furthermore, the present invention generates a preamble sequence using a Golay complementary sequence or a complex Golay complementary sequence in response to the length of the preamble sequence required for the OFDM communication system, such that it can generate an excellent preamble sequence with unlimited length and whose overall number is also not limited.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating a preamble sequence in an OFDM (Orthogonal Frequency Division Multiplexing) communication system that uses A sub-carriers in a frequency domain and uses N Tx (Transmission) antennas, comprising:

N sequence generators for each generating a sequence of a length equal to 'B/N' by dividing B sub-carriers from among the A sub-carriers by the 'N' indicative of the number of the Tx antennas; and N preamble sequence mappers for mapping individual components of the sequence to B/N sub-carriers from among the A sub-carriers on a one by one basis in order to assign the components of the sequence to the B/N sub-carriers, and assigning null data to remaining sub-carriers other than the B/N sub-carriers from among the A-sub-carriers, such that a preamble sequence of a corresponding Tx antenna is generated.

2. The apparatus according to claim 1, wherein the sequence is one of a Golay complementary sequence and a complex Golay complementary sequence.

3. The apparatus according to claim 1, wherein each sequence generator comprises:

a first Golay complementary sequence generator for generating a first Golay complementary sequence of a length 'L';

a second Golay complementary sequence generator for generating a second Golay complementary sequence of a length 'M'; and a Golay complementary sequence/Complex Golay, complementary sequence synthesizer for synthesizing the first Golay complementary sequence of the length 'L' and the second Golay complementary sequence of the length 'M' according to a predetermined control signal, and generating one of a Golay complementary sequence of the length 'B/N' and a Complex Golay complementary sequence of the length 'B/N'.

4. The apparatus according to claim 1, wherein the N preamble sequence mappers map the individual components of the sequence to the B/N sub-carriers from among the A sub-carriers on a one by one basis, the B/N sub-carriers having predetermined positions in response to the Tx antennas to which the preamble sequence mappers are connected.

5. A method for generating a preamble sequence in an OFDM (Orthogonal Frequency Division Multiplexing) communication system that uses A sub-carriers in a frequency domain and uses N Tx (Transmission) antennas, comprising the steps of:

a) generating N sequences, each having a length of 'B/N', by dividing B sub-carriers from among the A sub-carriers by the 'N' indicative of the number of the Tx antennas; and b) mapping, for each of the N sequences, individual components of the sequence to the B/N sub-carriers from among the A sub-carriers on a one by one basis in order to assign the components of the sequence to the B/N sub-carriers, and assigning null data to remaining sub-carriers other than the B/N sub-carriers from among the A-sub-carriers, such that a preamble sequence of a corresponding Tx antenna is generated.

6. The method according to claim 5, wherein the sequence is one of a Golay complementary sequence and a Complex Golay complementary sequence.

7. The method according to claim 5, wherein step (a) includes the steps of:

a1) generating a first Golay complementary sequence of a length 'L';

a2) generating a second Golay complementary sequence of a length 'M'; and a3) synthesizing the first Golay complementary sequence of length 'L' and the second Golay complementary sequence of the length 'M' according to a predetermined control signal, and generating one of a Golay complementary sequence of the length 'B/N' and a Complex Golay complementary sequence of the length 'B/N'.

8. The method according to claim 4, wherein step (b), includes the step of:

b1) mapping, for each of the N sequences, the components of the sequence to the B/N sub-carriers from among the A sub-carriers on a one by one basis, the B/N sub-carriers having predetermined positions in response to the Tx antennas over which the respective preamble sequences are transmitted.

9. An apparatus for channel estimation in an OFDM (Orthogonal Frequency Division Multiplexing) communication system that transmits preamble sequences over N Tx (Transmission) antennas and uses M Rx (Reception) antennas, comprising:

a first matrix synthesizer for receiving predetermined N preamble sequences related to the N Tx antennas to synthesize a first matrix;

a second matrix synthesizer for receiving M Rx signals from the M Rx antennas to synthesize a second matrix; and a matrix multiplier for multiplying the first matrix by the second matrix, and estimating a channel response in a time domain.

10. The apparatus according to claim 9, wherein the first matrix is determined:

$$(x^H x)^{-1} x^H$$

where x is indicative of a set of the N preamble sequences in the time domain, and H is indicative of a Hermitian matrix.

11. The apparatus according to claim 9, wherein the second matrix is indicative of a set of the M Rx signals.

12. The apparatus according to claim 9, wherein the channel response in the time domain is determined by:

$$h^* = (x^H x)^{-1} x^H y$$

where h* is indicative of a channel response in the time domain.

13. A method for channel estimation in an OFDM (Orthogonal Frequency Division Multiplexing) communication system that transmits preamble sequences over N Tx (Transmission) antennas and uses M Rx (Reception) antennas, comprising the steps of:

a) receiving predetermined N preamble sequences related to the N Tx antennas to synthesize a first matrix;

b) receiving M Rx signals from the M Rx antennas to synthesize a second matrix; and c) multiplying the first matrix by the second matrix, and estimating a channel response in a time domain.

14. The method according to claim 13, wherein the first matrix is determined by:

$$(x^H x)^{-1} x^H$$

where x is indicative of a set of the N preamble sequences in the time domain, and H is indicative of a Hermitian matrix.

15. The method according to claim 13, wherein the second matrix is indicative of a set of the M Rx signals.

16. The method according to claim 13, wherein the channel response in the time domain is determined by:

$$h^* = (x^H x)^{-1} x^H y$$

where h* is indicative of a channel response in the time domain.

17. An apparatus for generating a preamble sequence in an OFDM (Orthogonal Frequency Division Multiplexing) communication system that uses A sub-carriers in a frequency domain and uses N Tx (Transmission) antennas, comprising:
  N sequence generators for each generating a sequence of a length of 'B/N' by dividing B sub-carriers from among the A sub-carriers by the 'N' indicative of the number of the Tx antennas, mapping individual components of the sequence to the B/N sub-carriers from among the A sub-carriers on a one by one basis in order to assign the components of the sequence to the B/N sub-carriers, and assigning null data to remaining sub-carriers other than the B/N sub-carriers from among the A-sub-carriers, such that a preamble sequence in a frequency domain of a corresponding Tx antenna is generated;
  N IFFT (Inverse Fast Fourier Transform) units, are connected to each of the N preamble sequence generators, for receiving output signals of the preamble sequence generators, and IFFT-processing the received signals, such that each of the N IFFT units generates a preamble sequence in a time domain of a corresponding Tx antenna; and
  transmitters connected to the N IFFT units, each transmitter converts the IFFT-processed signal into a serial data signal, inserts a predetermined guard interval signal into the serial data signal, and transmits the resultant signal.

18. The N preamble sequence generators of, claim 17, each comprising:
  a sequence generator for generating a sequence of the length of 'B/N'; and
  a preamble sequence mapper for mapping the individual components of the sequence to the B/N sub-carriers from among the A sub-carriers on a one by one basis in order to assign the components of the sequence to the B/N sub-carriers, and assigning null data to remaining sub-carriers other than the B/N sub-carriers from among the A-sub-carriers, such that a preamble sequence of a corresponding Tx antenna is generated.

19. The apparatus according to claim 18, wherein sequence is one of a Golay complementary sequence and a Complex Golay complementary sequence.

20. The sequence generator of claim 19, comprising:
  a first Golay complementary sequence generator for generating a first Golay complementary sequence of a length of 'L';
  a second Golay complementary sequence generator for generating a second Golay complementary sequence of a length of 'M'; and
  a Golay complementary sequence/Complex Golay, complementary sequence synthesizer for synthesizing the first Golay complementary sequence of the length 'L' and the second Golay complementary sequence of the length 'M' according to a predetermined control signal, and generating one of a Golay complementary sequence of the length 'B/N' and a Complex Golay complementary sequence of the length 'B/N'.

21. The apparatus according to claim 17, wherein the N preamble sequence mappers map individual components of the sequence to the B/N sub-carriers from among the A sub-carriers on a one by one basis, the B/N sub-carriers having predetermined positions in response to Tx antennas to which the preamble sequence mappers are connected.

22. A method for generating a preamble sequence in an OFDM (Orthogonal Frequency Division Multiplexing) communication system that uses A sub-carriers in a frequency domain and uses N Tx (Transmission) antennas, comprising the steps of:
  a) generating N sequences, each having a length of 'B/N', by dividing B sub-carriers from among the A sub-carriers by the 'N' indicative of the number of the Tx antennas;
  b) mapping, for each of the N sequences, individual components of the sequence to B/N sub-carriers from among the A sub-carriers on a one by one basis in order to assign the components of the sequence to the B/N sub-carriers, and assigning null data to remaining sub-carriers other than the B/N sub-carriers from among the A-sub-carriers, such that N preamble sequences in frequency domains of corresponding Tx antennas are generated;
  c) IFFT (Inverse Fast Fourier Transform)—processing the N preamble sequences of the frequency domains, and generating N preamble sequences in time domains of the corresponding Tx antennas; and
  d) converting each of the N preamble sequence in the time domains into a serial data signal, inserting a predetermined guard interval signal into the serial data signal, and transmits the resultant signal.

23. The method according to claim 22, wherein the sequence is one of a Golay complementary sequence and a Complex Golay complementary sequence.

24. The method according to claim 23, wherein the sequence generation step includes the steps of:
  generating a first Golay complementary sequence of a length of 'L';
  generating a second Golay complementary sequence of a length of 'M'; and
  synthesizing the first Golay complementary sequence of the length 'L' and the second Golay complementary sequence of the length 'M' according to a predetermined control signal, and generating one of a Golay complementary sequence of the length 'B/N' and a Complex Golay complementary sequence of the length 'B/N'.

25. The method according to claim 22, wherein step (b) includes the step of:
  b1) mapping, for each of the N sequences, the components of the sequence to the B/N sub-carriers from among the A sub-carriers on a one by one basis, the B/N sub-carriers having predetermined positions in response to Tx antennas over which the respective preamble sequences are transmitted.

* * * * *